US008528432B2

(12) United States Patent
Nakamura

(10) Patent No.: US 8,528,432 B2
(45) Date of Patent: Sep. 10, 2013

(54) TWIN CLUTCH TRANSMISSION FOR LARGE-SIZED VEHICLE

(75) Inventor: Hideki Nakamura, Saitama (JP)

(73) Assignee: Hitachi Nico Transmission Co., Ltd., Saitama (JP)

( * ) Notice: Subject to any disclaimer, the term of this patent is extended or adjusted under 35 U.S.C. 154(b) by 118 days.

(21) Appl. No.: 13/254,360

(22) PCT Filed: Feb. 25, 2010

(86) PCT No.: PCT/JP2010/053486
§ 371 (c)(1),
(2), (4) Date: Sep. 1, 2011

(87) PCT Pub. No.: WO2010/103984
PCT Pub. Date: Sep. 16, 2010

(65) Prior Publication Data
US 2011/0308343 A1    Dec. 22, 2011

(30) Foreign Application Priority Data

Mar. 11, 2009   (JP) ................................ 2009-057636

(51) Int. Cl.
*F16H 3/08*      (2006.01)
(52) U.S. Cl.
USPC ............................................ 74/330; 71/331
(58) Field of Classification Search
USPC .................................. 74/330, 331, 333, 340
See application file for complete search history.

(56) References Cited

U.S. PATENT DOCUMENTS

| 4,876,907 | A | 10/1989 | Andersson et al. |
| 7,331,897 | B2 * | 2/2008 | Ibamoto et al. ............... 475/221 |
| 7,866,232 | B2 * | 1/2011 | Gitt et al. ........................ 74/745 |
| 8,161,835 | B2 * | 4/2012 | Borntrager ..................... 74/331 |
| 8,360,919 | B2 * | 1/2013 | Kraynev et al. ............... 475/207 |

FOREIGN PATENT DOCUMENTS

| JP | 63-203951 | 8/1988 |
| JP | 2007-303519 | 11/2007 |
| JP | 2008-240832 | 10/2008 |

OTHER PUBLICATIONS

International Search Report from International Application No. PCT/JP2010/053486 mailed May 11, 2010.

* cited by examiner

*Primary Examiner* — Ha D Ho
(74) *Attorney, Agent, or Firm* — Brundidge & Stanger, P.C.

(57) ABSTRACT

A twin clutch type transmission that permits a quick shifting of a mechanical clutch without shock. Numbers of gear teeth of speed-change gears of odd and even-numbered gear ranges, which mesh with the same output gear, are made to be identical each other; gear ratios of input gear trains of even and odd-numbered gear ranges are configured so that the speed-change ratios between adjoining gear ranges will form a geometric progression; and gear ratios between speed-change gears of odd and even-numbered gear ranges are configured to be proportional to square of the common ratio. In speed-changing intermediate shaft on which the speed-change gear is installed is coupled with input shaft through friction clutch, and speeds of revolutions of the speed-change gear and the intermediate shaft on which such speed-change gear is installed are brought into synchronized state.

4 Claims, 14 Drawing Sheets

TWIN CLUTCH TRANSMISSION FOR LARGE-SIZED VEHICLE

TECHNICAL FIELD

The present invention relates to a twin clutch type transmission suitable for a large-sized vehicle having a high-horsepower engine such as a large truck and a special work heavy vehicle.

BACKGROUND ART

Generally, a mechanical clutch represented typically by a dog clutch or a spline clutch, which establishes clutch engagement through a mechanical interlocking, needs no powers like hydraulic to maintain its interlocked or locked-up state once engaged; therefore, the mechanical clutch transfers the engine power efficiently toward output side. Because of this advantage, such a mechanical clutch has been used for such as a transmission for a passenger car.

The mechanical clutch of this sort requires synchronization of the speed of revolutions of the driving side and the driven side in making them engaged. In a transmission for a passenger car therefore, a synchromesh mechanism using friction on a tapered-cone has been generally used as the synchronizing device. Further to use of such device, an engine revolution control means is provided to regulate the revolution difference between the driving side and the driven side of the clutch to be within a predetermined range so that the gear change shock will be lightened and the clutch breakage will be prevented. Such an automotive twin clutch type transmission as uses such synchromesh mechanism has been described, for example, in the patent literature 1 listed below. As a transmission using a hydraulic friction clutch, which is suitable for a large-sized vehicle like a dump truck, a certain transmission has been described, for example, in the patent literature 2.

Patent Literature 1:
  Japanese Laid-Open Patent Application No. 2008-240832
Patent Literature 2:
  Japanese Laid-Open Patent Application No. 2007-303519

SUMMARY OF INVENTION

Technical Problems

In a large-sized vehicle having a high-horsepower engine however, its transmission should be capable of transferring a large torque. Therefore, the transmission requires to be equipped with such a synchromesh mechanism (synchronizing system) as has a large synchronization capacity appropriate to the torque to be transferred. Existing such a synchromesh mechanism as has been used in a passenger car has a difficulty in transferring a large torque of high-horsepower in terms of structure and strength. Therefore, it is hard to use such existing synchromesh mechanism for a large-sized vehicle from the viewpoint of durability and reliability. Further to that, there is another problem. It is difficult to change the engine speed instantly by controlling the engine revolution attempting quick synchronization, because the engine inertia grows as the engine size increases. This difficulty causes a dull response of the engine to command signal and a frequent racing of the engine on gear change generating large noise. Therefore, a transmission for a large-sized vehicle uses generally a hydraulic-operated friction clutch, which gives desired gear speeds with smooth engaging each of clutches on respective gear speed changes. In such transmission system, the upshifting or the downshifting of gear speed is established by sequentially engaging the clutch on the speed-change gear of next gear range of the gear-change destination through intentional clutch-slip after disengaging the clutch on the currently active gear range. However, this type of transmission still has a problem in that the shortening of the gear-shifting time requires the transmission system to have a highly precision clutch control system and a number of hydraulic systems.

The purpose of the present invention is to provide a twin clutch type transmission in a compact style that is capable of solving the above-stated problems realizing, with a simple structure, quick speed change of a mechanical clutch without relying on engine revolution control in clutch synchronization without shock, even in a transmission for a large-sized vehicle.

Means for Solution to Problem

To achieve the above-stated purpose, the present invention provides a transmission, comprising
  an input shaft connected to an engine;
  an intermediate shaft of odd-numbered gear range and an intermediate shaft of even-numbered gear range, which are arranged in parallel to the input shaft;
  an output shaft arranged in parallel to the intermediate shaft of odd-numbered gear range and the even-numbered gear range;
  an input gear of odd-numbered gear range and an input gear of even-numbered gear range, which are rigidly installed on the input shaft to transfer the revolution of the input shaft to the intermediate shaft of either of the intermediated shaft of odd-numbered gear range or the intermediate shaft of even-numbered gear range;
  a main transfer gear of odd-numbered gear range rotatably installed on the intermediate shaft of odd-numbered gear range;
  a main friction clutch of odd-numbered gear range that couples the main transfer gear of odd-numbered gear range with the intermediate shaft of odd-numbered gear range;
  a main transfer gear of even-numbered gear range rotatably installed on the intermediate shaft of even-numbered gear range;
  a main friction clutch of even-numbered gear range that couples the main transfer gear of even-numbered gear range with the intermediate shaft of even-numbered gear range;
  a plurality of speed-change gears of odd-numbered gear range rotatably installed on the intermediate shaft of odd-numbered gear range;
  a plurality of speed-change gears of even-numbered gear range rotatably installed on the intermediate shaft of even-numbered gear range;
  a plurality of output gears rigidly installed on the output shaft with each of which gears one speed-change gear of odd-numbered gear range and one speed-change gear of even-numbered gear range that is one range higher than that of such one speed-change gear of odd-numbered gear range are meshed; and
  a mechanical clutch installed on each of the intermediate shaft of odd-numbered gear range and the intermediate shaft of even-numbered gear range to selectively make mechanical interlock engagement with one of the speed-change gears,
    wherein
    the numbers of gear teeth of the speed-change gear of odd-numbered gear range and the speed-change gear of even-numbered gear range, both of which mesh with the same output gear of the output gears, are made to be identical;

the gear ratio of the input gear of even-numbered gear range and the input gear of odd-numbered gear range are configured so that the ratios of the speed-change ratios between the adjoining gear ranges will form terms in a geometric progression;

a clutch synchronization mechanism is provided, which makes the speed of revolutions of the intermediate shaft of either of the intermediate shaft of odd-numbered gear range or the intermediate shaft of even-numbered gear range, on which any of the speed-change gears of the gear-shifting destination is installed, and the speed of revolutions of the intermediate shaft of either of the intermediate shaft of even-numbered gear range or the intermediate shaft of odd numbered gear range to be synchronized each other by linking the intermediate shaft of either of the intermediate shaft of odd-numbered gear range or the intermediate shaft of even-numbered gear range, on which the speed-change gear of either of the speed-change gear of odd-numbered gear range or the speed-change gear of even numbered gear range is installed, to the input shaft via either of the input gear of odd-numbered gear range and the main transfer gear of odd-numbered gear range and the main friction clutch of odd-numbered gear range or the input gear of even-numbered gear range and the main transfer gear of even-numbered gear range and the main friction clutch of even-numbered gear range; and the mechanical clutch sleeve, which is associated with the speed-change gear and makes selective mechanical interlock engagement therewith, is preliminarily engaged with any of the speed-change gears of the gear-shifting destination prior to the changing of gear range.

To achieve the above-stated purpose, the clutch synchronization mechanism provided in the transmission by the present invention is comprised of:

an input gear for even-to-odd upshift rigidly installed on the input shaft; and a synchronization gear for even-to-odd upshift, which is rotatably installed on the intermediate shaft of odd-numbered gear range meshing with the input gear for even-to-odd upshift and is to be coupled with the intermediate shaft of odd-numbered gear range through an associated friction clutch, wherein the numbers of gear teeth of the synchronization gear for even-to-odd upshift and the input gear of even-to-odd upshift are made to be such a number that the gear ratio between these gears is inversely proportional to the square of the common ratio (or geometric ratio) that is the ratio of the speed-change ratios between the adjoining gear ranges.

Further, the clutch synchronization mechanism is comprised of:

an input gear for odd-to-even downshift rigidly installed on the input shaft; and a synchronization gear for odd-to-even downshift, which meshes with the input gear for odd-to-even downshift and is to be coupled with the intermediate shaft of even-numbered gear range through an associated friction clutch, wherein the numbers of gear teeth of the synchronization gear for odd-to-even downshift and the input gear of odd-to-even downshift are made to be such a number that the gear ratio between these gears is proportional to the square of the common ratio (or geometric ratio) that is the ratio of the speed-change ratios between the adjoining gear ranges.

To achieve the above-stated purpose, the clutch synchronization mechanism provided in the transmission by the present invention is comprised of a friction brake installed on each of said intermediate shaft of odd-numbered gear range and said intermediate shaft of even-numbered gear range; and thereby the speed of revolutions of said intermediate shaft of odd-numbered gear range or said intermediate shaft of even-numbered gear range is made to be controllable.

Although the present description indicates that the ratios of the speed-change ratios between the adjoining gear ranges should form terms in a geometric progression, the ratios of the speed-change ratio in an actual application are given such values as are nearly equal to the terms in a theoretical geometric progression, because the numbers of gear teeth of the speed-change gear and the transmission output gear do not always give exact geometric series of speed-change ratio. Therefore, for reasons of expediency in explanation, the following description uses the word "geometrical progression" including such a near geometrical progression.

In the present description, the odd-to-even upshift means the up-shifting from a speed-change gear of odd-numbered gear range to a speed-change gear of even-numbered gear range and the odd-to-even downshift means similarly the down-shifting, and the even-to-odd upshift means the up-shifting from a speed-change gear of even-numbered gear range to a speed-change gear of odd-numbered gear range and the even-to-odd downshift means similarly the down-shifting.

ADVANTAGEOUS EFFECTS OF INVENTION

The transmission by the present invention has such features as described below. In speed changing between the speed-change gear of odd-numbered gear range and the speed-change gear of even-numbered gear range, the intermediate shaft, on which the speed-change gear of the gear-shifting destination is installed, is linked to the input shaft via a friction clutch and a gear train. Following this, the speeds of revolutions of the speed-change gear of the gear-shifting destination and the intermediate shaft on which such the speed-change gear is installed is made to be in the synchronized state. Further, the mechanical clutch of the gear-shifting destination is engaged preliminarily. And then, the power from the engine is transferred to the mechanical clutch via a friction clutch. Thus, the present invention obtains a transmission in a compact style yet applicable to a large-sized vehicle that has a high-horsepower engine offering, with a simple structure, quick speed change without relying on engine revolution control for synchronization but with no speed-change shock.

DESCRIPTION OF EMBODIMENTS

The following explains a mode of implementing the present invention referring to drawings.

Embodiment 1

Figure 1:
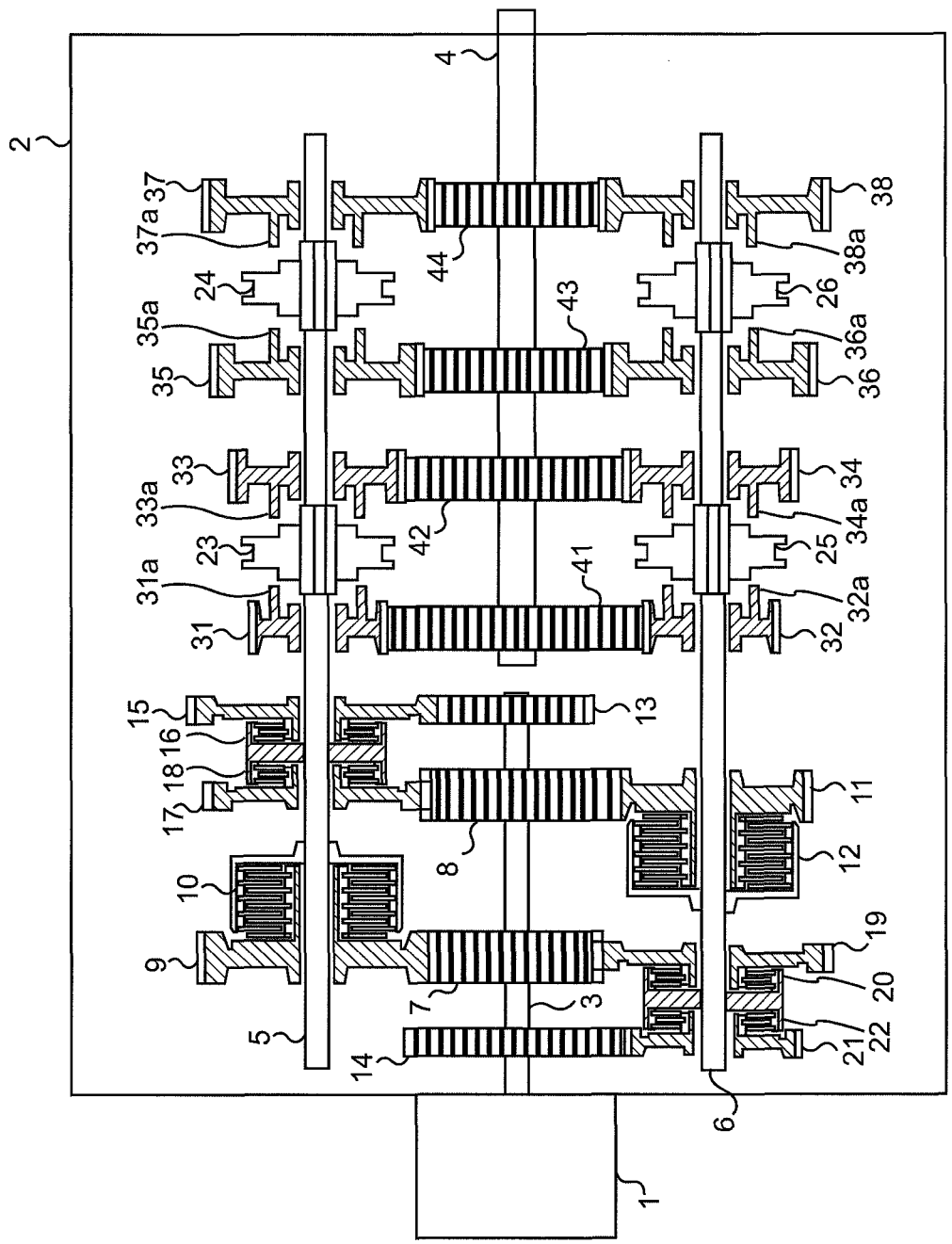
FIG. 1 is a configuration diagram that illustrates the first embodiment of the present invention.

FIG. 1 illustrates the first embodiment of the present invention. The transmission illustrated in FIG. 1 uses a spline clutch as the mechanical clutch, wherein the illustrated example covers the speed ranges from 1st-gear to 8th-gear. It should be noted that a reverse gear is not illustrated for simplicity since the reverse gear arrangement has no direct relation to the core of the present invention.

In FIG. 1, the output of an engine 1 is inputted in an input shaft 3 of a transmission 2. On the input shaft 3, an input gear of odd-numbered gear range 7, an input gear of even-numbered gear range 8, an input gear for even-to-odd upshift 13, and an input gear for odd-to-even downshift 14 are rigidly installed. In parallel to the input shaft 3, an intermediate shaft of odd-numbered gear range 5 and an intermediate shaft of even-numbered gear range 6 are arranged. On the intermediate shaft of odd-numbered gear range 5, a main transfer gear of odd-numbered gear range 9 is rotatably installed so as to mesh with the input gear of odd-numbered gear range 7. On the main transfer gear of odd-numbered gear range 9, a main friction clutch of odd-numbered gear range 10 is installed so as to permit establishing coupling with the intermediate shaft of odd-numbered gear range 5. An intermediate shaft fixing element of the main friction clutch of odd-numbered gear range 10 is formed integrally with a reverse-driven gear that is not illustrated.

On the intermediate shaft of even-numbered gear range 6, a main transfer gear of even-numbered gear range 11 that meshes with the input gear of even-numbered gear range 8 is rotatably installed. On the main transfer gear of even-numbered gear range 11, a main friction clutch of even-numbered gear range 12 is installed so as to permit establishing coupling with the intermediate shaft of even-numbered gear range 6. The main friction clutch of odd-numbered gear range 10 and the main friction clutch of even-numbered gear range 12 are hydraulically actuated clutches. In such type of a clutch, a friction plate makes pressure-contact by supplying working fluid and increasing the operating pressure of the working fluid causes increased frictional force with the transfer torque increased.

A synchronization gear for even-to-odd upshift 15 that meshes with the input gear for even-to-odd upshift 13 is rotatably installed on the intermediate shaft of odd-numbered gear range 5 and is coupled with the intermediate shaft of odd-numbered gear range 5 by the engagement of an associated friction clutch 16. On the intermediate shaft of odd-numbered gear range 5, a synchronization gear for even-to-odd downshift 17 that meshes with the input gear of even-numbered gear range 8 is rotatably installed. The synchronization gear for even-to-odd downshift 17 is coupled with the intermediate shaft of odd-numbered gear range 5 by the engagement of an associated friction clutch 18.

A synchronization gear for odd-to-even upshift 19, which meshes with the input gear of odd-numbered gear range 7 and is rotatably installed on the intermediate shaft of even-numbered gear range 6, is coupled with the intermediate shaft of even-numbered gear range 6 by the engagement of an associated friction clutch 20. On the intermediate shaft of even-numbered gear range 6, a synchronization gear for odd-to-even downshift 21 that meshes with the input gear for odd-to-even downshift 14 is rotatably installed. The synchronization gear for odd-to-even downshift 21 is coupled with the intermediate shaft of even-numbered gear range 6 by the engagement of an associated friction clutch 22. These friction clutches 16, 18, 20, and 22 are hydraulically actuated clutches similarly to friction clutches 10 and 12.

The numbers of gear teeth of the synchronization gear for odd-to-even upshift 19 and the main transfer gear of odd-numbered gear range 9 are made to be identical; and that of the synchronization gear for even-to-odd downshift 17 and the main transfer gear of even-numbered gear range 11 too are configured likewise. The numbers of gear teeth of the synchronization gear for even-to-odd upshift 15 and the input gear for even-to-odd upshift 13 are made to be such a number that the gear ratio between these gears is inversely proportional to the square of the common ratio (or geometric ratio) that is the ratio of the speed-change ratios between the adjoining gear ranges. The numbers of teeth of the synchronization gear for odd-to-even downshift 21 and the input gear for odd-to-even downshift 14 are made to be such a number that the gear ratio between these gears is proportional to the square of the common ratio (or geometric ratio) that is the ratio of the speed-change ratios between the adjoining gear ranges.

The input gear for even-to-odd upshift 13; the input gear for odd-to-even downshift 14; synchronization gears 15, 17, 19, and 21; and friction clutches 16, 18, 20, and 22, each of which is associated correspondingly with the synchronization gears 15, 17, 19, and 21 form the synchronization mechanism defined in the present invention to make the revolutions of the mechanical clutches, the working of which will be described later, to be brought into the synchronized state.

On the intermediate shaft of odd-numbered gear range 5, a plurality of speed-change gears of odd-numbered gear range (four gear ranges) are rotatably installed. The speed-change gears of odd-numbered gear range are comprised of 1st-gear 31, 3rd-gear 33, 5th-gear 35, and 7th-gear 37. Likewise, on the intermediate shaft of even-numbered gear range 6, a plurality of speed-change gears of even-numbered gear range comprised of 2nd-gear 32, 4th-gear 34, 6th-gear 36, and 8th-gear 38 are rotatably installed.

The 1st-gear 31 and the 2nd-gear 32 mesh with a transmission output gear 41, and similarly, the 3rd-gear 33 and the 4th-gear 34 with a transmission output gear 42, the 5th-gear 35 and the 6th-gear 36 with a transmission output gear 43, and the 7th-gear 37 and the 8th-gear 38 with a transmission output gear 44. Each of the transmission output gears 41 to 44 is rigidly installed on an output shaft 4.

As stated above, one speed-change gear of odd-numbered gear range and one speed-change gear of even-numbered gear range, the gear range of which is one range higher than that of such one speed-change gear of odd-numbered gear range, mesh with the same one transmission output gear in common, which is correspondingly assigned from among the transmission output gears 41 to 44. In this configuration, both the numbers of gear teeth of the speed-change gear of odd-numbered gear range and the speed-change gear of even-numbered gear range meshing with the same transmission output gear, which is correspondingly assigned from among the transmission output gears 41 to 44, are made to be identical.

On the intermediate shaft of odd-numbered gear range 5, a spline clutch is installed, wherein the engaging-teeth thereof for changing the gear train engagements between the 1st-gear 31 and the 3rd-gear 33 or between the 5th-gear 35 and the 7th-gear 37 is comprised of a spline. On the 1st-gear 31 and the 3rd-gear 33, internal splines 31*a* and 33*a*, each of which is one side of the engaging-teeth in the spline clutch, are formed respectively. The external spline, the other side of the engaging-teeth, is formed on a sleeve 23 axially movably installed on the intermediate shaft of odd-numbered gear range 5. Likewise further, internal splines 35*a* and 37*a* are formed on the 5th-gear 35 and the 7th-gear 37 respectively, and a sleeve 24 is axially movably installed on the intermediate shaft of odd-numbered gear range 5 at the position between the 5th-gear 35 and the 7th-gear 37.

On the intermediate shaft of even-numbered gear range 6, spline clutches for changing the gear trains between the 2nd-gear 32 and the 4th-gear 34 or between the 6th-gear 36 and the 8th-gear 38 are installed in a manner similar to the arrangement of the intermediate shaft of odd-numbered gear range 5. That is, on the 2nd-gear 32 and the 4th-gear 34, the internal splines 31*a* and 33*a* are formed respectively; on the 6th-gear 36 and the 8th-gear 38, an internal spline 36*a* and an female spline 38*a* are formed respectively; and a sleeve 25 and a sleeve 26 are axially movably installed on the intermediate shaft of even-numbered gear range 6 at the positions respectively between the 2nd-gear 32 and the 4th-gear 34 and between the 6th-gear 36 and the 8th-gear 38.

The spline clutch works in the shifting of the gear range as described below when, for example, the shifting is operated between the 1st-gear 31 and the 2nd-gear 33. The working of the spline clutch in this operation involves the intermediate shaft of odd-numbered gear range 5, internal splines 31*a* and 33*a*, and the sleeve (an external spline) 23. The sleeve 23 is moved by a shift fork (not shown in the figures) in the right or left direction on the intermediate shaft of odd-numbered gear range 5 so as to be engaged with the internal spline 31*a* on the 1st-gear 31 or with the internal spline 33*a* on the 3rd-gear 33; thus, the gear range is changed. Other gear range changes between the 5th-gear 35 and the 7th-gear 37, between the 2nd-gear 32 and the 4th-gear 34, and between the 6th-gear 36 and the 8th-gear 38 work in a similar manner.

Hereinafter where the context permits, the sleeves 23 to 26 may sometimes be referred to as the clutch sleeves or the spline clutches.

As has been proposed previously by the inventors of the present invention in the Japanese Patent Application No. 2007-278831, it is preferable that the spline clutch should use such a structure that each of the external and the internal splines thereof has engaging guide teeth (leading teeth) of a predetermined number of spline teeth protruding axially on the side face of its engaging portion.

In this embodiment, the ratio of the speeds of revolutions of the input shaft 3 $N_i$ and the output shaft 4 $N_o$ ($N_i/N_o$) of the transmission 2 while the spline clutch of the selected gear range and the main friction clutch 10 (or the main friction clutch 12) are engaged is referred to as the speed-change ratio. The ratios of the speed-change ratios between the adjoining gear ranges for the 1st-gear to the 8th-gear are configured so that they will form terms in a geometric progression.

In this configuration, the gear ratios of each of the speed-change gears in the speed-change gear trains are as listed below because the speed-change gears mesh with the same one transmission output gear in common, which is correspondingly assigned from among the transmission output gears 41 to 44.

Gear ratio of 1st-gear=(Gear 41/Gear 31)=Gear ratio of 2nd-gear=(Gear 41/Gear 32).

Gear ratio of 3rd-gear=(Gear42/Gear 33)=Gear ratio of 4th-gear=(Gear 42/Gear 34).

Gear ratio of 5th-gear=(Gear 43/Gear 35)=Gear ratio of 6th-gear=(Gear 43/Gear 36).

Gear ratio of 7th-gear=(Gear 44/Gear 37)=Gear ratio of 8th-gear=(Gear 44/Gear 38).

The speed-change ratio of each gear range is produced from respective speed-change gear ratios and the input gear ratio 1 (Gear 9/Gear 7) for the intermediate shaft of odd-numbered gear range 5 or from such speed-change gear ratio and the input gear ratio 2 (Gear 11/Gear 8) for the intermediate shaft of even-numbered gear range 6. The ratio of the input gear ratio 1 to the input gear ratio 2 is designed to be equivalent to the gear ratio for one gear range shift and each reduction ratio in this embodiment is determined so that the input gear ratio 1 will be larger than the input gear ratio 2.

Accordingly, the speed-change ratios of the 1st-gear and the 2nd-gear are expressed in the following manner:

Speed-change ratio of 1st-gear=(Input gear ratio 1×Gear ratio of 1st-gear), and

Speed-change ratio of 2nd-gear=(Input gear ratio 2×Gear ratio of 2nd-gear).

Thus, the 1st-gear 31 and the 2nd-gear 32 produce speed-change ratios different each other although the gear ratio of the 1st-gear is equal to the gear ratio of the 2nd-gear.

Likewise, the speed-change ratio of the 3rd-gear is expressed in the following manner:

Speed-change ratio of 3rd-gear=(Input gear ratio 1×Gear ratio of 3rd-gear)=(Common ratio×Input gear ratio 2×Gear ratio of 2nd-gear)

Accordingly, the gear ratio of the 3rd-gear is expressed in the following manner:

Gear ratio of 3rd-gear=(Common ratio×Input gear ratio 2×Gear ratio of 2nd-gear/Input gear ratio 1).

The definition of the common ratio is

Common ratio=(Input gear ratio 2/Input gear ratio 1), and the gear ratio of the 3rd-gear is expressed as given below.

Gear ratio of 3rd-gear=(Square of common ratio×Gear ratio of 2nd-gear).

The common ratio in a practical use takes a near-geometric ratio because the number of the gear teeth must be an integer. For example, when the input gear ratio 1 is designed to be 2.00 and the input gear ratio 2 to be 1.567, then the common ratio is approximately 0.78. Where the gear ratio of the 2nd-gear is specified to be 2.10 under this condition, the gear teeth ratio is determined according to the above indicated equations so that the ratio of the 3rd-gear will be around 1.28.

Next, the working in the gear range changing is explained. In any gear range, the gear range changing operation is performed keeping the revolution of the engine as before the changing. The explanation is provided for the upshift operation from a 1st-gear drive to a 2nd-gear drive, referring to FIGS. 2 and 3.

Figure 2:
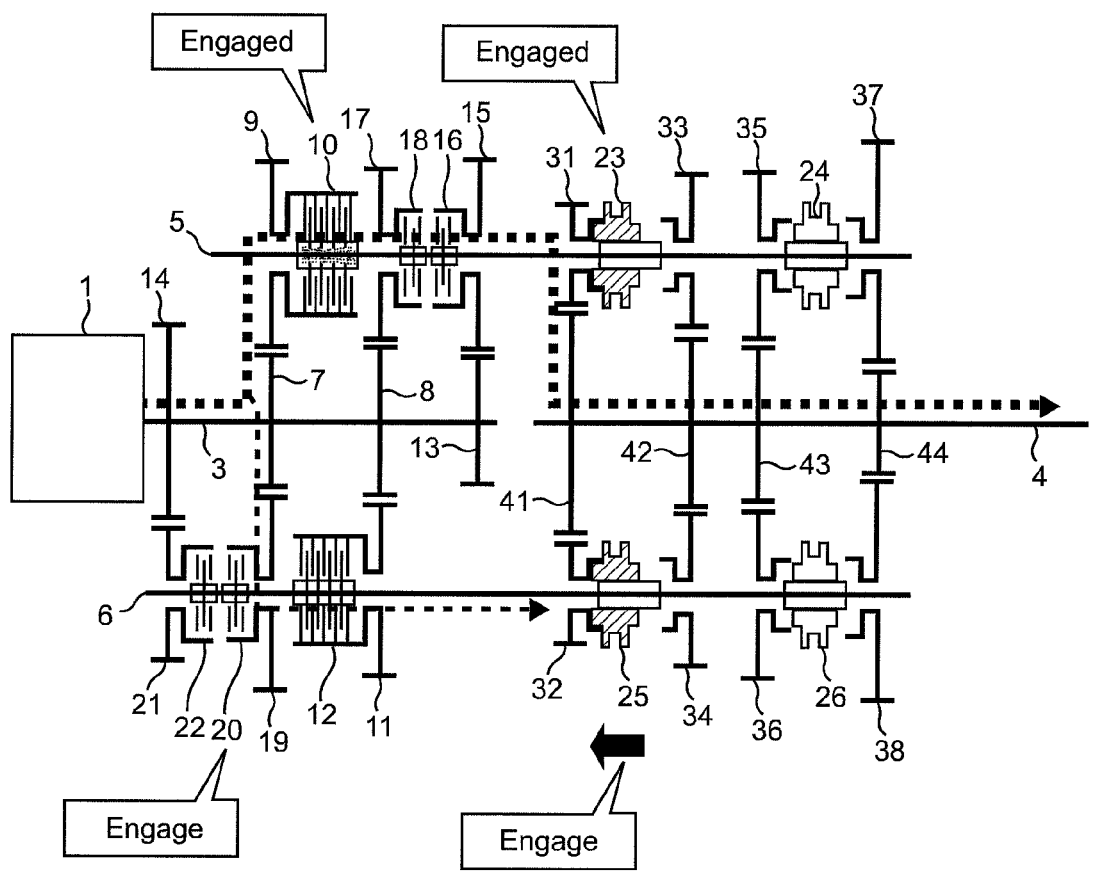
FIG. 2 is an explanatory diagram that illustrates the working of the first embodiment.

During the 1st-gear drive, as illustrated in FIG. 2, the main friction clutch of odd-numbered gear range 10 is engaged to couple the main transfer gear of odd-numbered gear range 9 with the intermediate shaft of odd-numbered gear range 5, and the external spline of the clutch sleeve 23 is in the engaged state with the internal spline 31a of the 1st-gear 31. Therefore, during the 1st-gear drive, the torque from the engine 1 is transferred all to the output shaft 4 along the path indicated by the arrow-headed thick dotted line. To operate the upshift to the 2nd-gear, the clutch sleeve 25 on the intermediate shaft of even-numbered gear range 6 is made to engage with the 2nd-gear 32 as a preliminary to the speed-change during the 1st-gear drive. To establish the engagement however, it is necessary to synchronize the speeds of revolutions of the 2nd-gear 32 and the clutch sleeve 25 within the tolerable revolution difference. During the 1st-gear drive, the 2nd-gear 32 is linked to the 1st-gear 31 namely the intermediate shaft of odd-numbered gear range 5 via the transmission output gear 41. Therefore, the 2nd-gear 32 rotates at the same speed of revolutions of the intermediate shaft of odd-numbered gear range 5 during the 1st-gear drive. In this state, the intermediate shaft of even-numbered gear range 6 is rotating because of a frictional drag caused by the main friction clutch of even-numbered gear range 12. Therefore, in the case of upshifting, the speed of revolutions of the intermediated shaft on which the speed-change gear of the gear-shifting destination is installed is higher than the speed of revolutions of the speed-change gear of the gear-shifting destination. This can be clearly known by finding the speeds of revolutions of the intermediate shafts on which the speed-change gears of the upshifting destination are installed (namely, the intermediate shaft of odd-numbered gear range 5 or the intermediate shaft of even-numbered gear range 6) based on the input gear ratio 1, the input gear ratio 2, and gear ratios of the 1st-gear through the 8th-gear.

In contrast in the case of downshifting, the speed of revolutions of the speed-change gear of the gear-shifting destination is higher than the speed of revolutions of the intermediate shaft on which the speed-change gear of the gear-shifting destination is installed.

Engaging the friction clutch 20 couples the synchronization gear for odd-to-even upshift 19 with the intermediate shaft of even-numbered gear range 6. Then, the torque is transferred to the intermediate shaft of even-numbered gear range 6 from the input shaft 3 along the path indicated by the arrow-headed thin dotted line. On the other hand, the synchronization gear for odd-to-even upshift 19 is linked to the main transfer gear of odd-numbered gear range 9 via the main input gear of odd-numbered gear range 7 and the numbers of gear teeth of the synchronization gear for odd-to-even upshift 19 and the main transfer gear of odd-numbered gear range 9 are made to be identical. Therefore, the speed of revolutions of the intermediate shaft of even-numbered gear range 6 is slowed down to the speed of revolutions of the intermediate shaft of odd-to-even gear range 5.

When the speed of revolutions of the intermediate shaft of even-numbered gear range 6 becomes equal to that of the intermediate shaft of odd-numbered gear range 5, the speeds of revolutions of the 2nd-gear 32 and the clutch sleeve 25 enter the synchronized state. Under this synchronized condition, the sleeve 25 is made to engage with the internal spline 32a to cause the spline clutch 25 to engage with the 2nd-gear 32. Thereby, the 2nd-gear 32 is coupled with the intermediate shaft of even-numbered gear range 6 prior to the clutch switching between the main friction clutch of odd-numbered gear range 10 and the main friction clutch of even-numbered gear range 12. The friction clutch 20 is disengaged on the engaging of the spline clutch 25 with the 2nd-gear 32.

As described above, during the 1st-gear drive, the friction clutch 20 on the synchronization gear for odd-to-even upshift 19 is engaged. Following this, the speeds of revolutions of the 2nd-gear 32 of the gear-shifting destination and the intermediate shaft of even-numbered gear range 6 are brought into the synchronized state. And then, the spline clutch 25 is preliminarily engaged with the 2nd-gear 32. The preliminary engaging of the clutch 25 with the 2nd-gear 32 made during the 1st-gear drive does not cause the transferring of the torque to the intermediate shaft of even-numbered gear range 6 because the main friction clutch of even-numbered gear range 12 is in the disengaged state.

Figure 3:
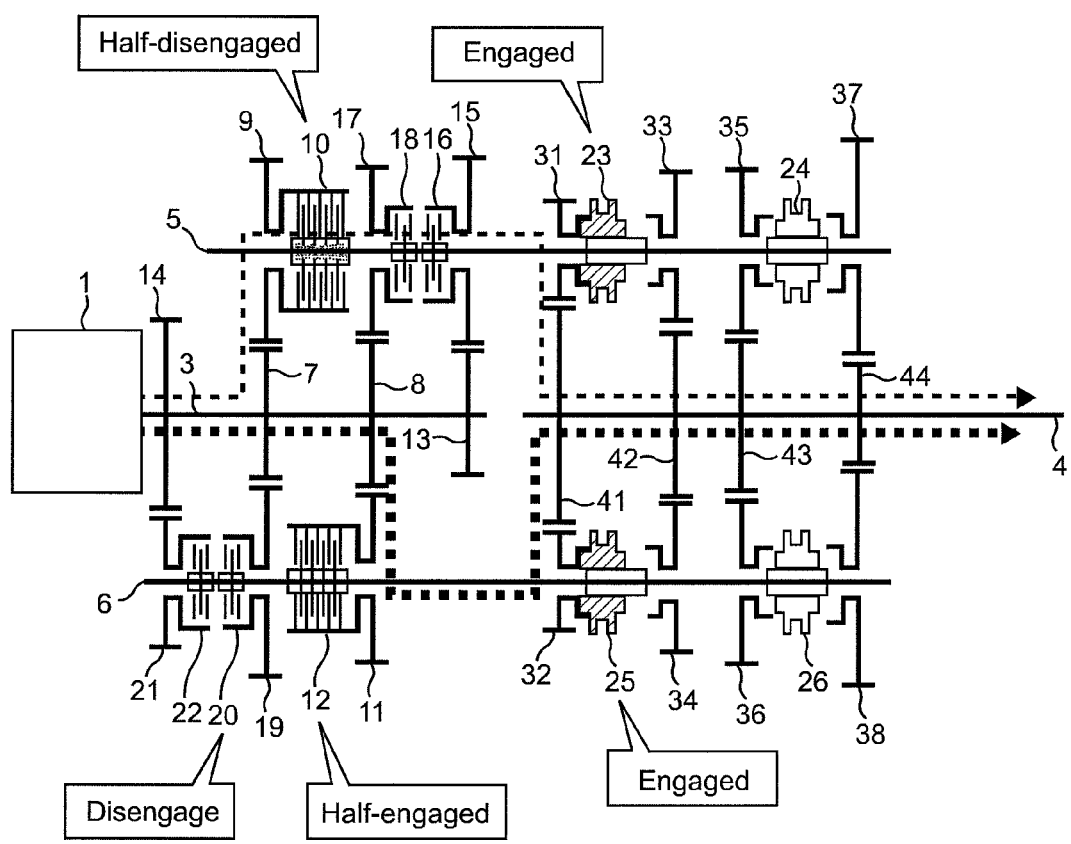
FIG. 3 is an explanatory diagram that illustrates the working of the first embodiment.

After the preliminary engaging of the spline clutch 25 with the 2nd-gear 32, the main friction clutch of odd-numbered gear range 10 is disengaged as illustrated in FIG. 3, with the main friction clutch of even-numbered gear range 12 being brought into the engaged state. This causes the torque transferred from the engine 1 to the intermediate shaft of odd-numbered gear range 5 to switch to the intermediate shaft of even-numbered gear range 6. As a consequence of this, the torque from the engine 1 is transferred all to the output shaft 4 through the 2nd-gear 32 and via the transmission output gear 41 along the path indicated by the arrow-headed thick dotted line.

Disengaging the main friction clutch of odd-numbered gear range 10 causes the torque working on the 1st-gear 31 to be disappeared. Accordingly, the spline clutch 23 is withdrawn from the 1st-gear 31 to be disengaged. Thus, the upshift operation from the 1st-gear drive to the 2nd-gear completes.

Figure 4:
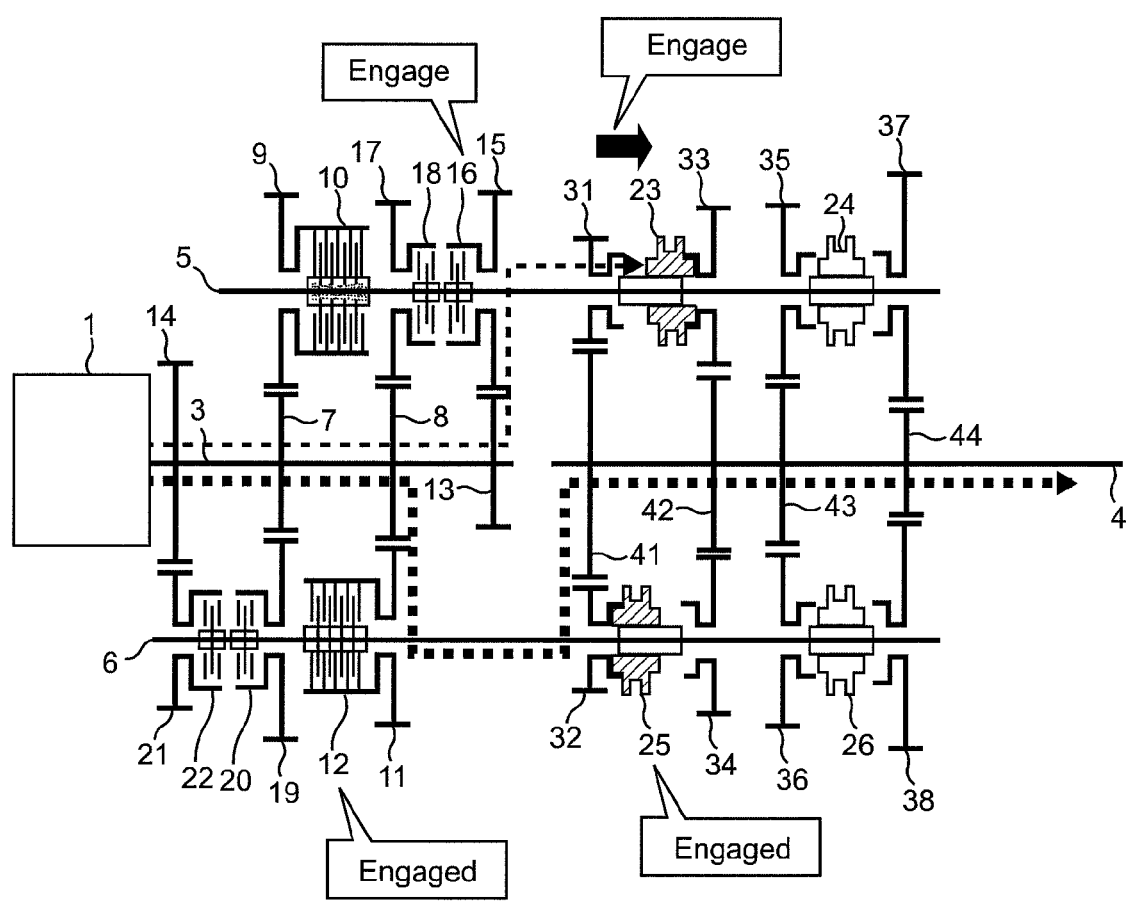
FIG. 4 is an explanatory diagram that illustrates the working of the first embodiment.
Figure 5:
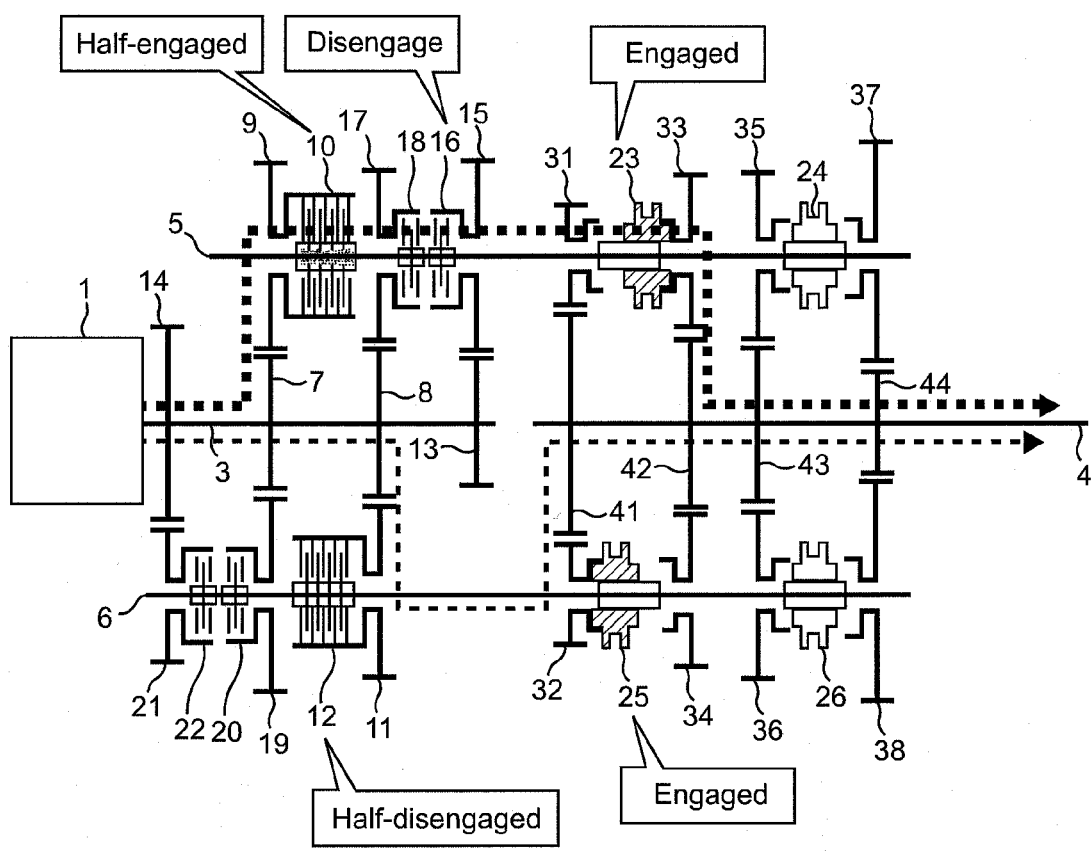
FIG. 5 is an explanatory diagram that illustrates the working of the first embodiment.

Next, the working in the upshifting from the 2nd-gear drive to the 3rd-gear is explained referring to FIG. 4 and FIG. 5. That is, the working in the upshifting from the 2nd-gear 32 that meshes with the transmission output gear 41 to the 3rd-gear 33 that meshes with the transmission output gear 42 will be described.

During the 2nd-gear drive, as illustrated in FIG. 4, the main friction clutch of even-numbered gear range 12 is engaged to couple the main transfer gear of even-numbered gear range 11 with the intermediate shaft of even-numbered gear range 6, and the clutch sleeve 25 is in the engaged state with the internal spline 32a of the 2nd-gear 32. Therefore, the torque from the engine 1 is transferred all to the output shaft 4 along the path indicated by the arrow-headed thick dotted line. To operate the upshift to the 3rd-gear, the clutch sleeve 23 is made to engage with the 3rd-gear 33 as a preliminary to the speed-change during the 2nd-gear drive. To establish the engagement however, it is necessary to synchronize the speeds of revolutions of the 3rd-gear 33 and the sleeve 23. During the 2nd-gear drive, the 3rd-gear 33 is linked to the 2nd-gear 32 namely the intermediate shaft of even-numbered gear range 6 via the transmission output gear 42, the output shaft 4, and the transmission output gear 41. Therefore, the speed of revolutions of the 3rd-gear 33 becomes the value of Speed of revolutions of the intermediate shaft of even-numbered gear range 6÷Gear ratio of 2nd-gear×Gear ratio of 3rd-gear. As described previously, Gear ratio of 3rd-gear=Square of common ratio×Gear ratio of 2nd-gear.

As a consequence of this therefore, the speed of revolutions of the 3rd-gear 33 becomes the value of Speed of revolutions of intermediate shaft of even-numbered gear range 6×Square of common ratio. In the above example, since the common ratio is specified to be about 0.78, the speed of revolutions of the 3rd-gear 33 becomes about 0.61 times the speed of revolutions of the intermediate shaft of even-numbered gear range 6, which means that the 3rd-gear 33 rotates slower than the intermediate shaft of even-numbered gear range 6. In this state, the intermediate shaft of odd-numbered gear range 5 is rotating because of a frictional drag caused by the main friction clutch of odd-numbered gear range 11, as stated above. Therefore, in the above-stated example, the speed of revolutions of the intermediated shaft of odd-numbered gear range 5 becomes about 0.78 times the speed of revolutions of the intermediate shaft of even-numbered gear range 6, because the input gear ratios are designed to be Input gear ratio 1=2.00 and Input gear ratio 2=1.567.

This means that the intermediated shaft of odd-numbered gear range 5 rotates faster than the 3rd-gear 33.

Engaging the friction clutch 16 couples the synchronization gear for even-to-odd upshift 15 with the intermediate shaft of odd-numbered gear range 5. Then, the torque is transferred to the intermediate shaft of odd-numbered gear range 5 from the input shaft 3 along the path indicated by the arrow-headed thin dotted line, because the synchronization gear for even-to-odd upshift 15 is linked to the input shaft 3 via the input gear for even-to-odd upshift 13. In this state, the input shaft 3 is linked to the main transfer gear even-numbered gear range 11 via the input gear of even-numbered gear range 8.

The gear ratio between the synchronization gear for even-to-odd upshift 15 and the input gear for even-to-odd upshift 13 (synchronization gear 15/input gear for upshift 13) is designed to conform to the common ratio. As stated before, the speed of revolutions of the 3rd-gear 33 becomes the value of Speed of revolutions of intermediate shaft of even-numbered gear range 6×Square of common ratio; and the speed of revolutions of the input shaft 3 is determined to be Speed of revolutions of intermediate shaft of even-numbered gear range 6×Input gear ratio 2. This means that this gear ratio is set at the value of Input gear ratio 2÷Square of common ratio. Therefore, the speed of revolutions of the intermediate shaft of odd-numbered gear range 5 is slowed down to the speed of revolutions of the 3rd-gear 33 immediately on engagement of the friction clutch 16.

When the speed of revolutions of the intermediate shaft of odd-numbered gear range 5 is slowed to the speed of revolutions of the 3rd-gear 33, the speeds of revolutions of the 3rd-gear 33 and the clutch sleeve 23 enter the synchronized state. Under this synchronized condition, the sleeve 23 is made to engage with the internal spline 33a to cause the spline clutch 23 to engage with the 3rd-gear 33. The friction clutch 16 is disengaged on engaging the spline clutch 23 with the 3rd-gear 33.

As described above, during the 2nd-gear drive, the friction clutch 16 on the synchronization gear for even-to-odd upshift 15 is made to be engaged state. Following this, the speeds of revolutions of the 3rd-gear 33 of the gear-shifting destination and the intermediate shaft of odd-numbered gear range 5 are brought into the synchronized state. And then, the spline clutch 23 is preliminarily engaged with the 3rd-gear 33. The preliminary engaging of the spline clutch 23 with the 3rd-gear 33 made during the 2nd-gear drive does not cause the transferring of the torque to the intermediate shaft of odd-numbered gear range 5 because the main friction clutch of odd-numbered gear range 10 is in the disengaged state.

After the preliminary engaging of the spline clutch 23 with the 3rd-gear 33, the main friction clutch of even-numbered gear range 12 is disengaged as illustrated in FIG. 5, with the main friction clutch of odd-numbered gear range 10 being brought into the engaged state. This causes the torque transferred from the engine 1 to the intermediate shaft of even-numbered gear range 6 to switch to the intermediate shaft of odd-numbered gear range 5. As a consequence of this, the torque from the engine 1 is transferred all to the output shaft 4 through the 3rd-gear 33 and via the transmission output gear 42 along the path indicated by the arrow-headed thick dotted line.

On the other hand, disengaging the main friction clutch of even-numbered gear range 12 causes the torque being transmitted on the 2nd-gear 32 to be disappeared. Accordingly, the spline clutch 25 is withdrawn from the 2nd-gear 32 to be disengaged. Thus, the upshift operation from the 2nd-gear drive to the 3rd-gear completes.

Hence, the upshifting from the 1st-gear 31 to the 2nd-gear 32, wherein these gears mesh with the transmission output gear 41 in common, and the upshifting from the 2nd-gear 32 that meshes with the transmission output gear 41 to the 3rd-gear 33 that meshes with the transmission output gear 42, wherein the transmission output gears 41 and 42 are adjacent to each other, are performed as explained above. Other upshiftings: 3rd-gear to 4th-gear, 5th to 6th, and 7th to 8th; and 2nd-gear to 3rd-gear, 4th to 5th, and 6th to 7th are performed likewise.

Figure 6:
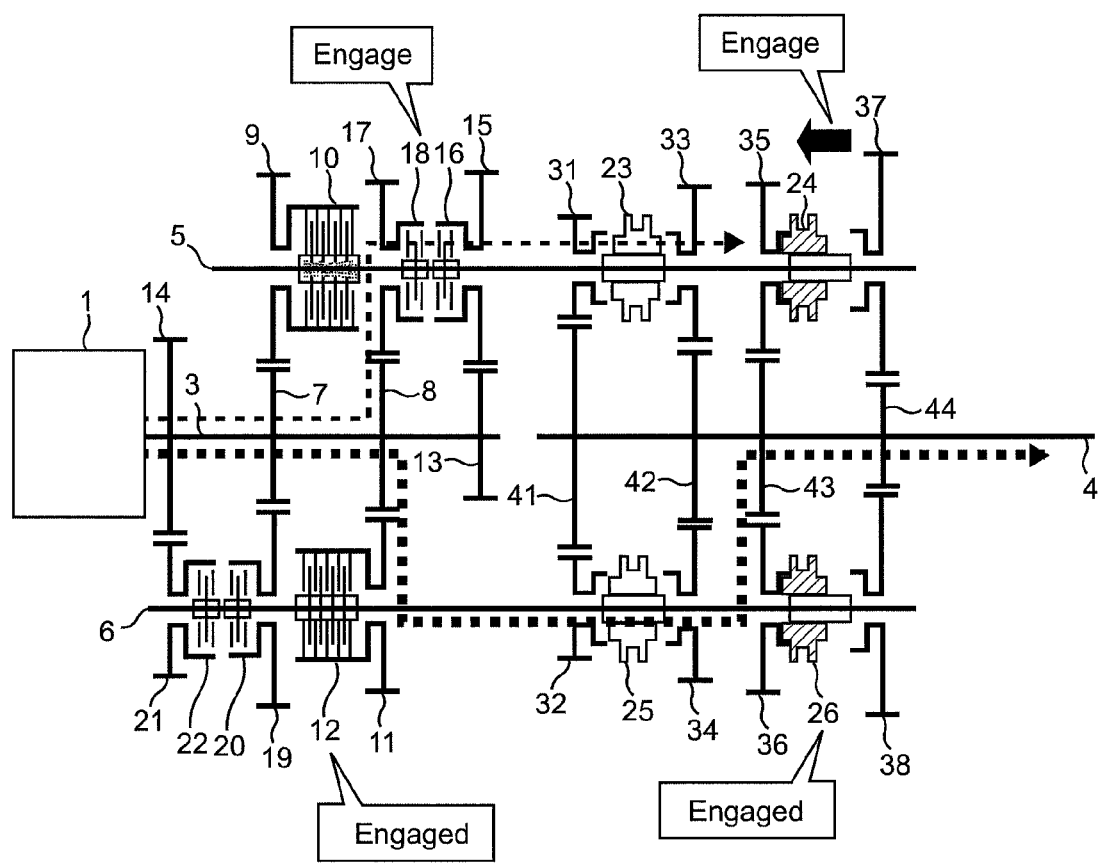
FIG. 6 is an explanatory diagram that illustrates the working of the first embodiment.
Figure 7:
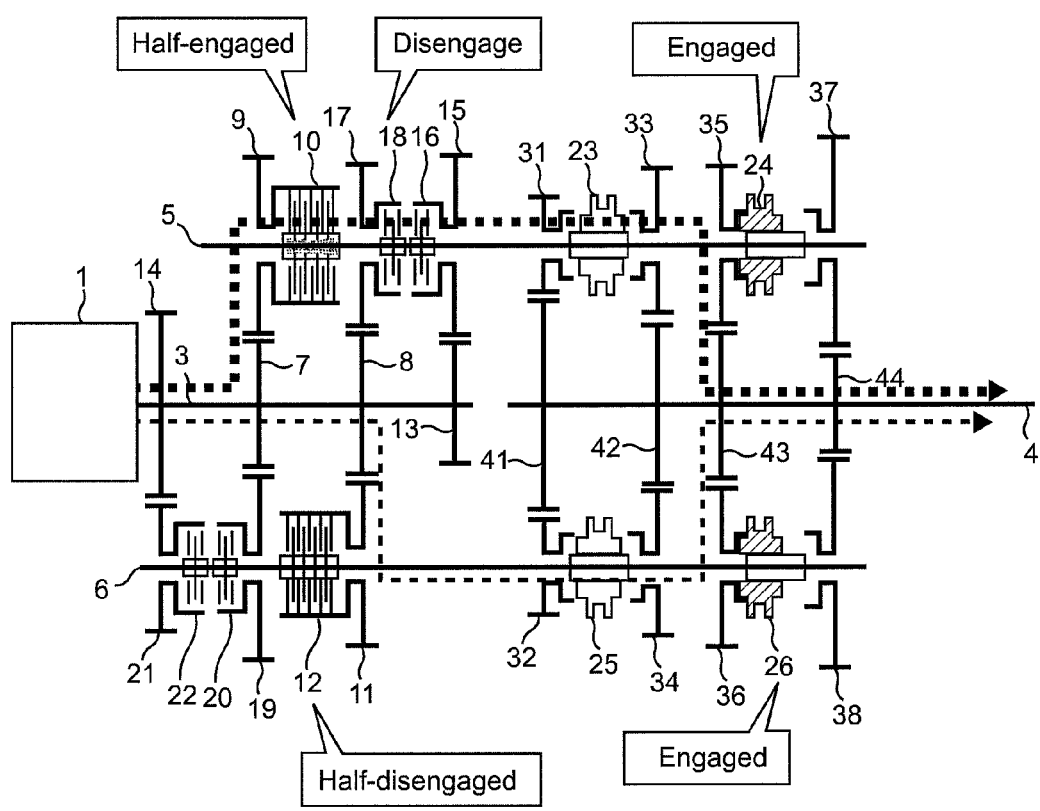
FIG. 7 is an explanatory diagram that illustrates the working of the first embodiment.

Next, the working in the gear range changing in the downshifting is explained referring to FIG. 6 and FIG. 7. These FIGS. 6 and 7 illustrate the speed changing working in the downshifting from the 6th-gear 36 to the 5th-gear 35, wherein these gears mesh with the transmission output gear 43 in common.

During the 6th-gear drive, as illustrated in FIG. 6, the main friction clutch of even-numbered gear range 12 is engaged to couple the main transfer gear of even-numbered gear range 11 with the intermediate shaft of even-numbered gear range 6, and the clutch sleeve 26 is in the engaged state with the internal spline 36a of the 6th-gear 36. Therefore, the torque from the engine 1 is transferred all to the output shaft 4 along the path indicated by the arrow-headed thick dotted line. To operate the downshift to the 5th-gear, the clutch sleeve 24 is made to engage with the 5th-gear 35 as a preliminary to the speed-change during the 6th-gear drive. To establish the engagement however, it is necessary to synchronize the speeds of revolutions of the 5th-gear 35 and the clutch sleeve 24. During the 6th-gear drive, the 5th-gear 35 is linked to the 6th-gear 36 namely the intermediate shaft of even-numbered gear range 6 via the transmission output gear 43. Therefore, the 5th-gear 35 rotates at the same speed of revolutions of the intermediate shaft of even-numbered gear range 6.

On the other hand, the intermediate shaft of odd-numbered gear range 5 is rotating because of a frictional drag caused by the main friction clutch of odd-numbered gear range 10. However, the speed of revolutions thereof is lower than the speed of revolutions of the intermediate shaft of even-numbered gear range 6 because of the gear ratio as stated above. Engaging the friction clutch 18 under this state as a preliminary to the speed-change causes the synchronization gear for even-to-odd downshift 17 to couple with the intermediate shaft of odd-numbered gear range 5. Then, the torque is transferred to the intermediate shaft of odd-numbered gear range 5 from the input shaft 3 along the path indicated by the arrow-headed thin dotted line.

The synchronization gear for even-to-odd downshift 17 is linked to the main transfer gear of even-numbered gear range 11 via the main input gear of even-numbered gear range 8, and the numbers of gear teeth of the synchronization gear for even-to-odd downshift 17 and the main transfer gear of odd-numbered gear range 11 are made to be identical. Therefore, the speed of revolutions of the intermediate shaft of odd-numbered gear range 5 is increased to the equal rate of that of the intermediate shaft of even-to-odd gear range 5.

When the speed of revolutions of the intermediate shaft of odd-numbered gear range 5 becomes equal to that of the intermediate shaft of even-numbered gear range 6, the 5th-gear 35 and the clutch sleeve 24 enter the synchronized state. Under this synchronized condition, the clutch sleeve 24 is made to engage with the internal spline 35a to cause the spline clutch 24 to be engaged with the 5th-gear 35. The friction clutch 18 is disengaged on engaging the spline clutch 24 with the 5th-gear 35.

As described above, during the 6th-gear drive, the friction clutch 18 on the synchronization gear for even-to-odd downshift 17 is engaged. Following this, the speeds of revolutions of the 5th-gear 35 of the gear-shifting destination and the intermediate shaft of odd-numbered gear range 5 are brought into the synchronized state. And then, the spline clutch 24 is preliminarily engaged with the 5th-gear 35. The preliminary engaging of the spline clutch 24 with the 5th-gear 35 made during the 6th-gear drive does not cause the transferring of the torque to the intermediate shaft of odd-numbered gear range 5 because the main friction clutch of odd-numbered gear range 10 is in the disengaged state.

After the preliminary engaging of the spline clutch 24 with the 5th-gear 35, the main friction clutch of even-numbered gear range 12 is disengaged as illustrated in FIG. 7, with the main friction clutch of odd-numbered gear range 10 being brought into engaged state. This causes the torque transferred from the engine 1 to the intermediate shaft of even-numbered gear range 6 to switch to the intermediate shaft of odd-numbered gear range 5. As a consequence of this, the torque from the engine 1 is transferred all to the output shaft 4 through the 5th-gear 35 and via the transmission output gear 43 along the path indicated by the arrow-headed thick dotted line.

Disengaging the main friction clutch of even-numbered gear range 12 causes the torque working on the 6th-gear 36 to be disappeared. Accordingly, the spline clutch 24 is withdrawn from the 6th-gear 36 to be disengaged. Thus, the downshift operation from the 6th-gear drive to the 5th-gear completes.

Figure 8:
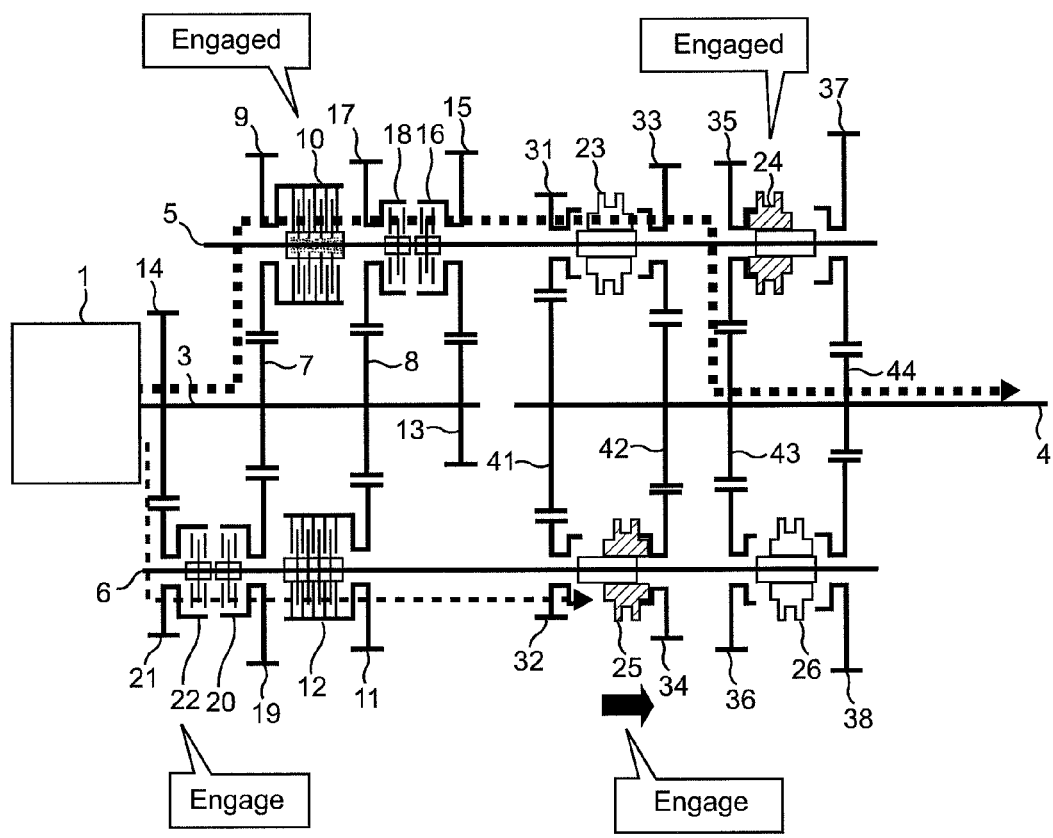
FIG. 8 is an explanatory diagram that illustrates the working of the first embodiment.
Figure 9:
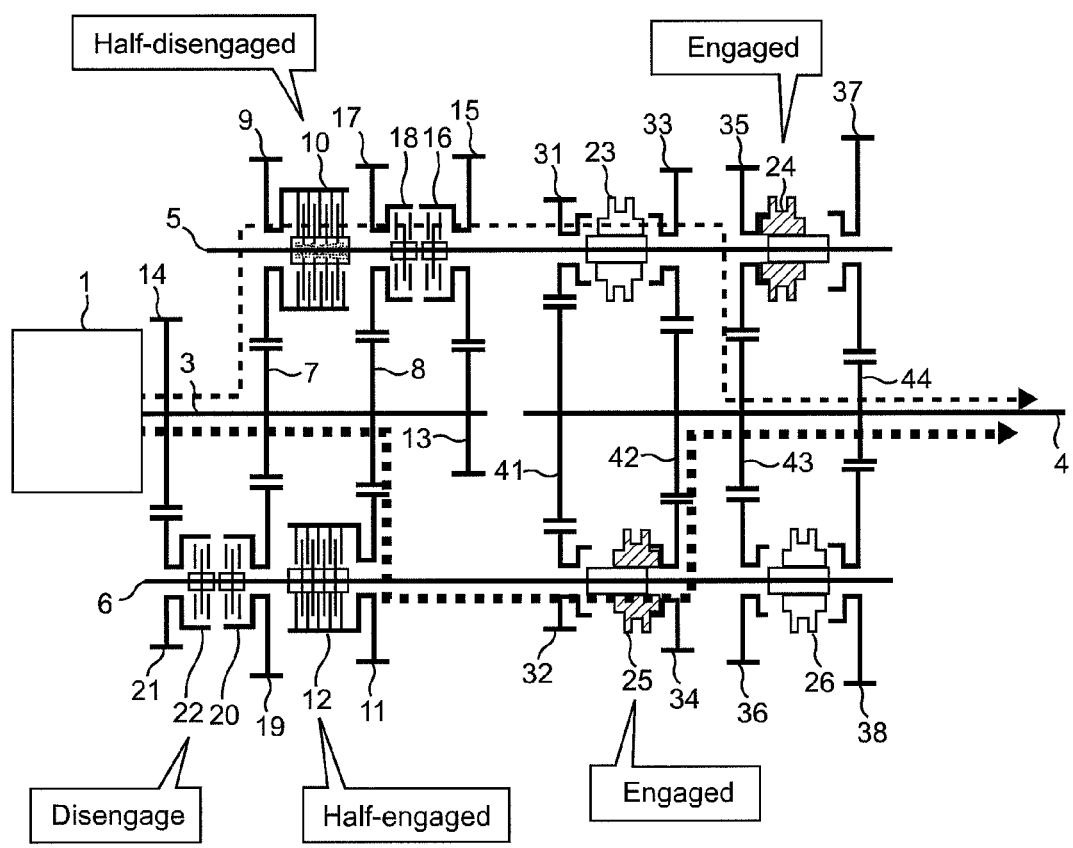
FIG. 9 is an explanatory diagram that illustrates the working of the first embodiment.

Next, the working in the downshifting from the 5th-gear drive to the 4th-gear is explained referring to FIG. 8 and FIG. 9. That is, the working in the downshifting from the 5th-gear 35 that meshes with the transmission output gear 43 to the 4th-gear that meshes with the transmission output gear 42 will be described.

During the 5th-gear drive, as illustrated in FIG. 8, the main friction clutch of odd-numbered gear range 10 is engaged to couple the main transfer gear of odd-numbered gear range 9 with the intermediate shaft of odd-numbered gear range 5, and the clutch sleeve 24 is in the engaged state with the internal spline 35a of the 5th-gear 35. Therefore, the torque from the engine 1 is transferred all to the output shaft 4 along the path indicated by the arrow-headed thick dotted line. To operate the downshift to the 4th-gear, the clutch sleeve 25 is made to engage with the 4th-gear 34 as a preliminary to the speed-change during the 5th-gear drive. To establish the engagement however, it is necessary to synchronize the 4th-gear 34 and the sleeve 25. During the 5th-gear drive, the 4th-gear 34 is linked to the 5th-gear 35 namely the intermediate shaft of odd-numbered gear range 5 via the transmission output gear 42, the output shaft 4, and the transmission output gear 43. Therefore, the speed of revolutions of the 4th-gear 34 becomes the value of Speed of revolutions of the intermediate shaft of odd-numbered gear range 5÷Gear ratio of 5th-gear×Gear ratio of 4th-gear. Because, Gear ratio of 5th-gear=Square of common ratio×Gear ratio of 4th-gear, the speed of revolutions of the 4th-gear 34 becomes the value of Speed of revolutions of intermediate shaft of odd-numbered gear range 5÷Square of common ratio. In this example, since the common ratio is specified to be about 0.78, the speed of revolutions of the 4th-gear 34 becomes about 1.63 times the speed of revolutions of the intermediate shaft of odd-numbered gear range 5, which means that the 4th-gear 34 rotates faster than the intermediate shaft of odd-numbered gear range 5.

In this state meanwhile, the intermediate shaft of even-numbered gear range 6 is rotating because of a frictional drag caused by the main friction clutch of even-numbered gear range 12. Therefore, in this example, the speed of revolutions of the intermediate shaft of even-numbered gear range 6 becomes about 1.28 times the speed of revolutions of the intermediate shaft of odd-numbered gear range 5, because the input gear ratios are designed to be Input gear ratio 1=2.00 and Input gear ratio 2=1.567.

This means that the intermediate shaft of even-numbered gear range 6 rotates slower than the speed of revolutions of the 4th-gear 34. Engaging the friction clutch 22 in this state as a preliminary to the speed-change causes the synchronization gear for odd-to-even downshift 21 to couple with the intermediate shaft of even-numbered gear range 6. Then, the torque is transferred to the intermediate shaft of even-numbered gear range 6 from the input shaft 3 along the path indicated by the arrow-headed thin dotted line. In this state, the synchronization gear for odd-to-even downshift 21 is linked to the input shaft 3 via the input gear for odd-to-even downshift 14, and the input shaft 3 is linked to the main transfer gear of odd-numbered gear range 9 via the input gear of odd-numbered gear range 7.

The gear ratio between the synchronization gear for odd-to-even downshift 21 and the input gear for odd-to-even downshift 14 is designed to conform to the common ratio and, as described above, the speed of revolutions of the 4th-gear 34 is about 1.63 times the speed of revolutions of the intermediate shaft of odd-numbered gear range 5. Therefore, it is enough for obtaining the synchronized state to determine that the speed of revolutions of the intermediate shaft of even-numbered gear range 6 is equal to that. Thus, the gear ratio between the synchronization gear for odd-to-even downshift 21 and the input gear for odd-to-even downshift 14 (synchronization gear 21/input gear for downshift 14) is designed to be Square of the common ratio×Input gear ratio 1. Thereby, engaging the friction clutch 22 brings the speeds of revolutions of the 4th-gear 34 and the clutch sleeve 25 into the synchronized state. And then, the spline clutch 25 is engaged with the 4th-gear 34. The friction clutch 22 is disengaged on engaging the spline clutch 25 to the 4th-gear 34.

As described above, during the 5th-gear drive, the friction clutch 22 on the synchronization gear for even-to-odd upshift 21 is engaged. Following this, the speeds of revolutions of the 4th-gear 34 of the gear-shifting destination and the intermediate shaft of even-numbered gear range 6 are brought into the synchronized state. And then, the spline clutch 25 is preliminarily engaged with the 4rd-gear 34. The preliminary engaging of the clutch 25 with the 4th-gear 34 made during the 5th-gear drive does not cause the transferring of the torque to the intermediate shaft of even-numbered gear range 6 because the main friction clutch of even-numbered gear range 12 is in the disengaged state.

After the preliminary engaging of the spline clutch 25 with the 4th-gear 34, the main friction clutch of odd-numbered gear range 10 is disengaged as illustrated in FIG. 9, with the main friction clutch of even-numbered gear range 12 being brought into engaged state. This causes the torque transferred from the engine 1 to the intermediate shaft of odd-numbered gear range 5 to switch to the intermediate shaft of even-numbered gear range 6. As a consequence of this, the torque from the engine 1 is transferred all to the output shaft 4 through the 4th-gear 34 and via the transmission output gear 42 along the path indicated by the arrow-headed thick dotted line. Disengaging the main friction clutch of odd-numbered gear range 10 causes the torque working on the 5th-gear 35 to be disappeared. Accordingly, the spline clutch 24 is withdrawn from the 5th-gear 35 to be disengaged. Thus, the downshift operation to the 4th-gear completes.

Thus, the downshifting from the 6th-gear 36 to the 5th-gear 35, wherein these gears mesh with the transmission output gear 43 in common, and the downshifting from the 5th-gear 35 that meshes with the transmission output gear 43 to the 4th-gear 34 that meshes with the transmission output gear 42, wherein the transmission output gears 43 and 42 are adjacent to each other, are performed as explained above. Other downshiftings: 8th-gear to 7th-gear, 4th to 3rd, and 2nd to 1st; and 7th-gear to 6th-gear, and 3rd to 2nd are performed likewise.

The upshifting and downshifting work as described above. Summary for helping eased understanding their workings will be as follows.

In the upshifting between gear ranges (1st-gear to 2nd-gear, 3rd to 4th, 5th to 6th, and 7th to 8th), wherein the speed-change gears in such adjoining gear ranges mesh with the same one transmission output gear in common, the speed of revolutions of the intermediate shaft of even-numbered gear range 6, on which the speed-change gear of the gear-shifting destination is installed, and the speed of revolutions of speed-change gears 32, 34, 36, and 38 of the even-numbered gear range enter the synchronized state immediately on engagement of the friction clutch 20. This is because of that the numbers of gear teeth of the main transfer gear of odd-numbered gear range 9 and the synchronization gear for odd-to-even upshift 19 are made identical. Thus, the preliminary engagement is instantly established.

In the upshifting between gear ranges (2nd-gear to 3rd-gear, 4th to 5th, and 6th to 7th), wherein the speed-change gears in such adjoining gear ranges severally mesh with a different transmission output gear, the speed of revolutions of the intermediate shaft of odd-numbered gear range 5, on which the speed-change gear of the gear-shifting destination is installed, and the speed of revolutions of speed-change gears 31, 33, 35, and 37 of the odd-numbered gear range enter the synchronized state immediately on engagement of the friction clutch 16. This is because of that the gear ratio between the synchronization gear for the even-to-odd upshift 15 and the input gear for even-to-odd upshift 13 is designed to be Input gear ratio÷Square of common ratio.

In the downshifting between gear ranges (8st-gear to 7th-gear, 6th to 5th, 4th to 3rd, and 2nd to 1st), wherein the speed-change gears in such adjoining gear ranges mesh with the same one transmission output gear in common, the speed of revolutions of the intermediate shaft of odd-numbered gear range 5, on which the speed-change gear of the gear-shifting destination is installed, and the speed of revolutions of speed-change gears 31, 33, 35, and 37 of the odd-numbered gear range enter the synchronized state immediately on engagement of the friction clutch 18. This is because of that the numbers of gear teeth of the main transfer gear of even-numbered gear range 11 and the synchronization gear for even-to-odd downshift 17 are made identical.

In the upshifting between gear ranges (7th-gear to 6th-gear, 5th to 4th, and 3rd to 2nd), wherein the speed-change gears in such adjoining gear ranges severally mesh with a different transmission output gear, the speed of revolutions of the intermediate shaft of even-numbered gear range 6, on which the speed-change gear of the gear-shifting destination is installed, and the speed of revolutions of speed-change gears 32, 34, and 36 of the even-numbered gear range enter the synchronized state immediately on engagement of the friction clutch 22. This is because of that the gear ratio between the synchronization gear for the odd-to-even downshift 21 and the input gear for odd-to-even downshift 14 is designed to be Square of common ratio×Input gear ratio 1.

The working of the speed changing in the upshifting and downshifting are performed as described above. In the speed-changing between the speed-change gear of odd-numbered gear range and the speed-change gear of even-numbered gear range, the intermediate shaft on which the speed-change gear of the gear-shifting destination is installed is linked to the input shaft through the friction clutch. Following this, the speeds of revolutions of the speed-change gear of the gear-shifting destination and the intermediate shaft on which such speed-change gear is installed are brought into the synchronized state. Further, the mechanical clutch is engaged preliminarily. And then, the main friction clutch of the gear-shifting destination is fully engaged. Therefore, this arrangement permits the quick shifting of the mechanical clutch without shock with a simple structure even in the case of a transmission for a large-sized vehicle, which must transfer a large torque, without relying on engine revolution control for clutch synchronization.

In the embodiment 1, the upshifting and the downshifting completes only by engaging the synchronization clutch that is associated with each of four synchronization gears requiring no controls over the speeds of revolutions of the intermediate shafts of odd-numbered gear range and of even-numbered gear range for the preliminary engaging. Therefore, this arrangement has a practical advantage of eliminating the need for use of a sensor for sensing the speed of revolutions of such intermediate shafts.

In the embodiment 1, the external spline is structured as a moving element that moves in the axial direction on the rotating shaft. It is however a matter of course that such moving element may be structured in a form of an internal spline and accordingly the mating element thereto may be an external spline.

Embodiment 2

Figure 10:
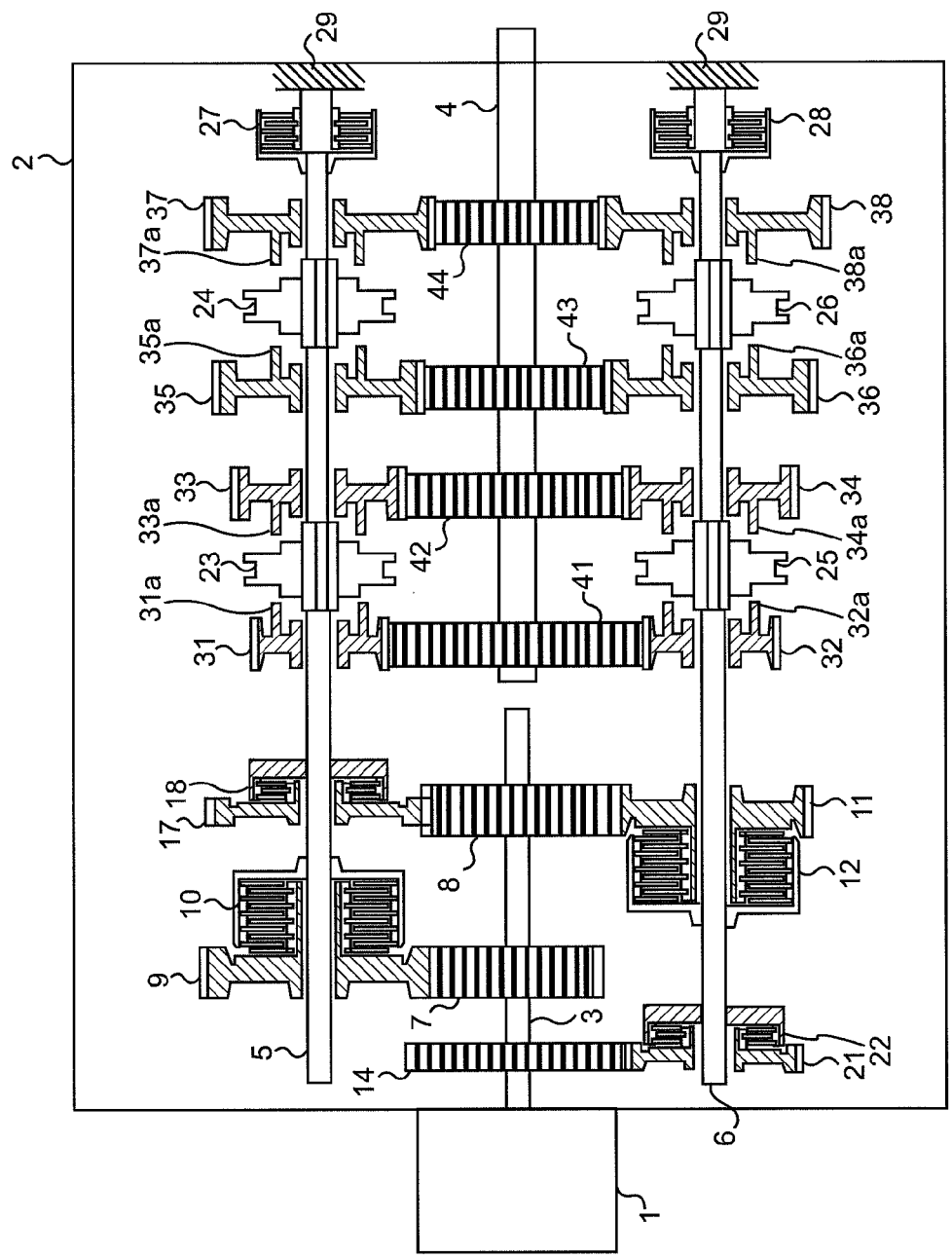
FIG. 10 is a configuration diagram that illustrates the second embodiment of the present invention.

FIG. 10 illustrates the second embodiment of the present invention. The embodiment 2 is provided with a brake so as to reduce the speed of revolutions of the intermediate shaft on which the speed-change gear is installed for the preliminary engagement in the upshifting.

In FIG. 10, the like reference numerals appeared in FIG. 1 designate corresponding parts throughout the drawing. A friction brake 27, one end of which is secured on a transmission casing 29, is provided on one end of the intermediate shaft of odd-numbered gear range 5 and a friction brake 28, one end of which is secured on the transmission casing 29, is provided on one end of the intermediate shaft of even-numbered gear range 6. The friction brakes 27 and 28 are hydraulic operated type multi plate wet brakes. Other ends of both the intermediate shafts 5 and 6 are rotatably supported on the transmission casing 29.

Next, the upshifting from the 1st-gear drive to the 2nd-gear will be explained referring to FIG. 11 and FIG. 12; that is, the working of the speed changing in the upshifting from the 1st-gear 31 to the 2nd-gear 32, wherein these gears mesh with the transmission output gear 41 in common, will be described.

Figure 11:
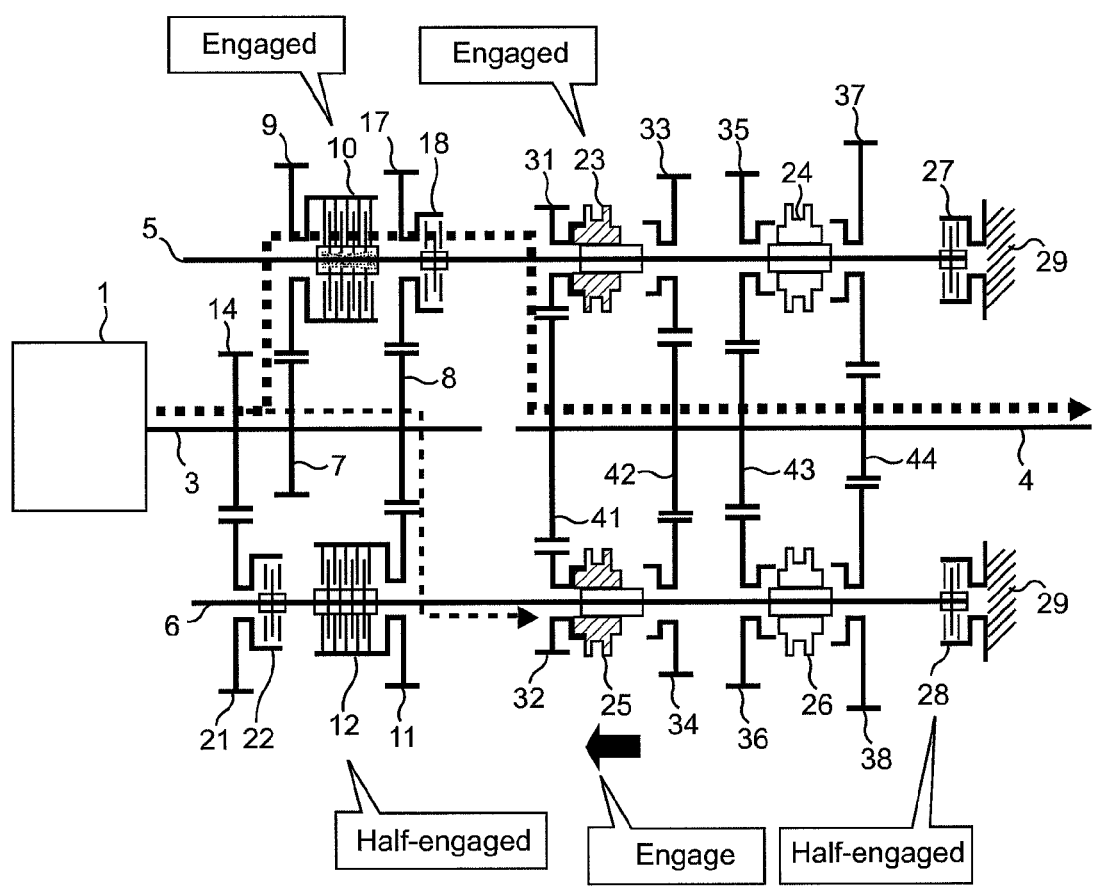
FIG. 11 is an explanatory diagram that illustrates the working of the second embodiment.

During the 1st-gear drive, as illustrated in FIG. 11, the main friction clutch of odd-numbered gear range 10 is engaged to couple the main transfer gear of odd-numbered gear range 9 with the intermediate shaft of odd-numbered gear range 5, and the external spline of the clutch sleeve 23 is in the engaged state with the internal spline 31a of the 1st-gear 31. Therefore, during the 1st-gear drive, the torque from the engine 1 is transferred all to the output shaft 4 along the path indicated by the arrow-headed thick dotted line. To operate the upshift to the 2nd-gear, the clutch sleeve 25 is made to engage with the 2nd-gear 32 as a preliminary to the speed-change during the 1st-gear drive. To establish the coupling however, it is necessary to synchronize the speeds of revolutions of the 2nd-gear 32 and the clutch sleeve 25 within the tolerable revolution difference. During the 1st-gear drive, the 2nd-gear 32 is linked to the 1st-gear 31 namely the intermediate shaft of odd-numbered gear range 5 via the transmission output gear 41. Therefore, the 2nd-gear 32 rotates at the same speed of revolutions of the intermediate shaft of odd-numbered gear range 5 (at the specified rate of revolution) during the 1st-gear drive. In this state, the speed of revolutions of the intermediate shaft of even-numbered gear range 6 is, as described in the explanation for the embodiment 1, higher than the speed of revolution of the intermediate shaft of odd-numbered gear range 5 because of a frictional drag caused by the main friction clutch of even-numbered gear range 12.

Although on the other hand, the clutch sleeve 25 rotates integrally with the intermediate shaft of even-numbered gear range 6, the speed of revolutions thereof is determined by the balance of torques frictionally transferred from the main friction clutch of even-numbered gear range 12 and from the friction brake 28, and varies depending on the viscosity of the oil.

Under this condition, the main friction clutch of even-numbered gear range 12 is engaged in a half-clutching state and the friction brake 28 is activated. And then, the operating pressure of the working fluid of the brake is controlled so that the speed of revolutions of the intermediate shaft of even-numbered gear range 6 will become almost equal to the predetermined speed of revolutions of the intermediate shaft of odd-numbered gear range 5. Engaging the main friction clutch of even-numbered gear range 12 in a half-clutching state causes the transferring of the torque from the input shaft 3 to the intermediate shaft of even-numbered gear range 6 along the path indicated by the arrow-headed thin dotted line. When thereby the speed of revolutions of the intermediate shaft of even-numbered gear range 6 becomes almost equal to that of the intermediate shaft of odd-numbered gear range 5, the speeds of revolutions of the 2nd-gear 32 and the clutch sleeve 25 enter the synchronized state. Then, the spline clutch 25 is engaged with the 2nd-gear 32.

As described above, the main friction clutch of even-numbered gear range 12 is engaged in the half-clutching state during the 1st-gear drive, the operating pressure of the working fluid of the friction brake 28 is controlled so that the speeds of revolutions of the 2nd-gear 32 of the gear-shifting destination and the intermediate shaft of even-numbered gear range 6 will become the synchronized state, and then, the spline clutch 25 is preliminary engaged with the 2nd-gear 32.

Figure 12:
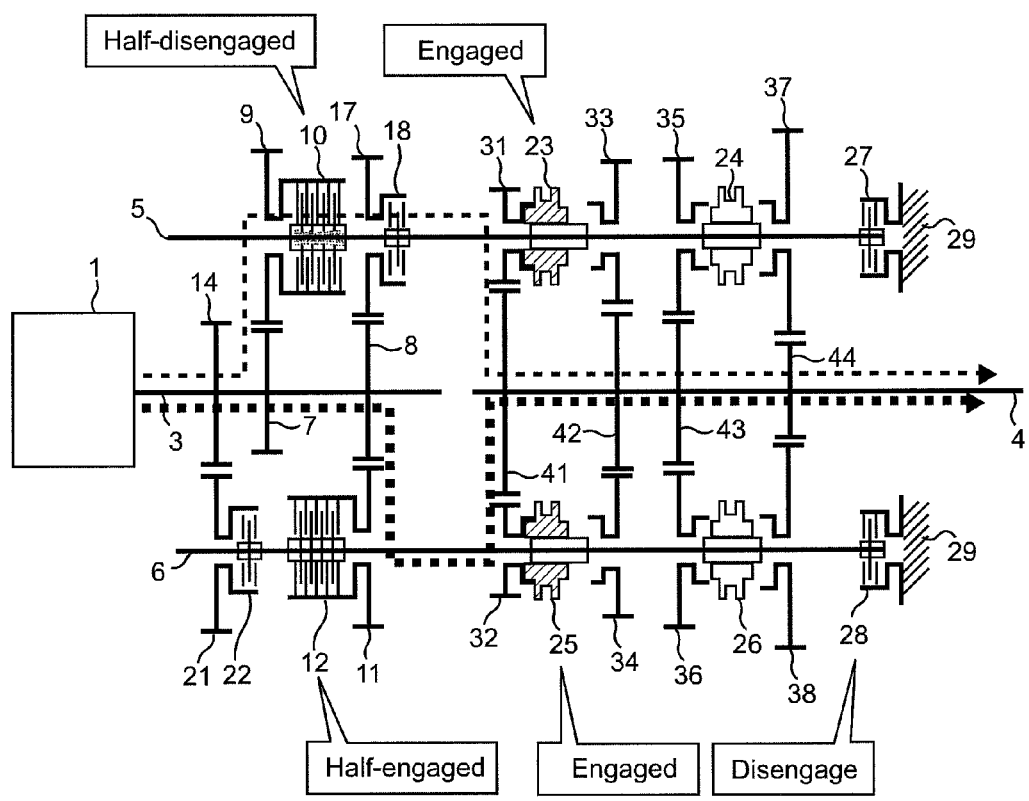
FIG. 12 is an explanatory diagram that illustrates the working of the second embodiment.

After the preliminary engaging of the spline clutch 25 with the 2nd-gear 32, the main friction clutch of even-numbered gear range 12 is engaged and the main friction clutch of odd-numbered gear range 10 is disengaged as illustrated in FIG. 12. Thereby, the torque transferred from the engine 1 to the intermediate shaft of odd-numbered gear range 5 switches to the intermediate shaft of even-numbered gear range 6. As a consequence of this, the torque from the engine 1 is transferred all to the output shaft 4 through the 2nd-gear 32 and via the transmission output gear 41 along the path indicated by the arrow-headed thick dotted line.

Disengaging the main friction clutch of odd-numbered gear range 10 causes the torque working on the 1st-gear 31 to be disappeared. Accordingly, the spline clutch 23 is withdrawn from the 1st-gear 31 to be disengaged. Thus, the upshift operation from the 1st-gear drive to the 2nd-gear completes.

Figure 13:
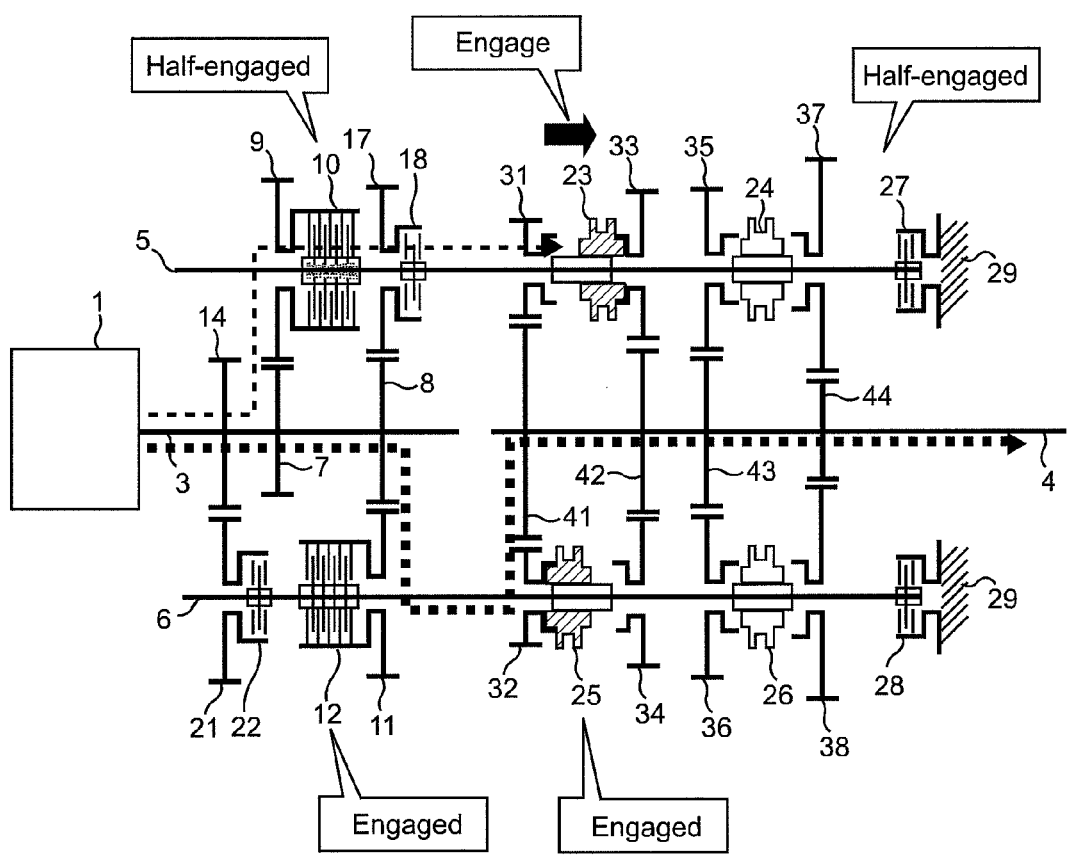
FIG. 13 is an explanatory diagram that illustrates the working of the second embodiment.
Figure 14:
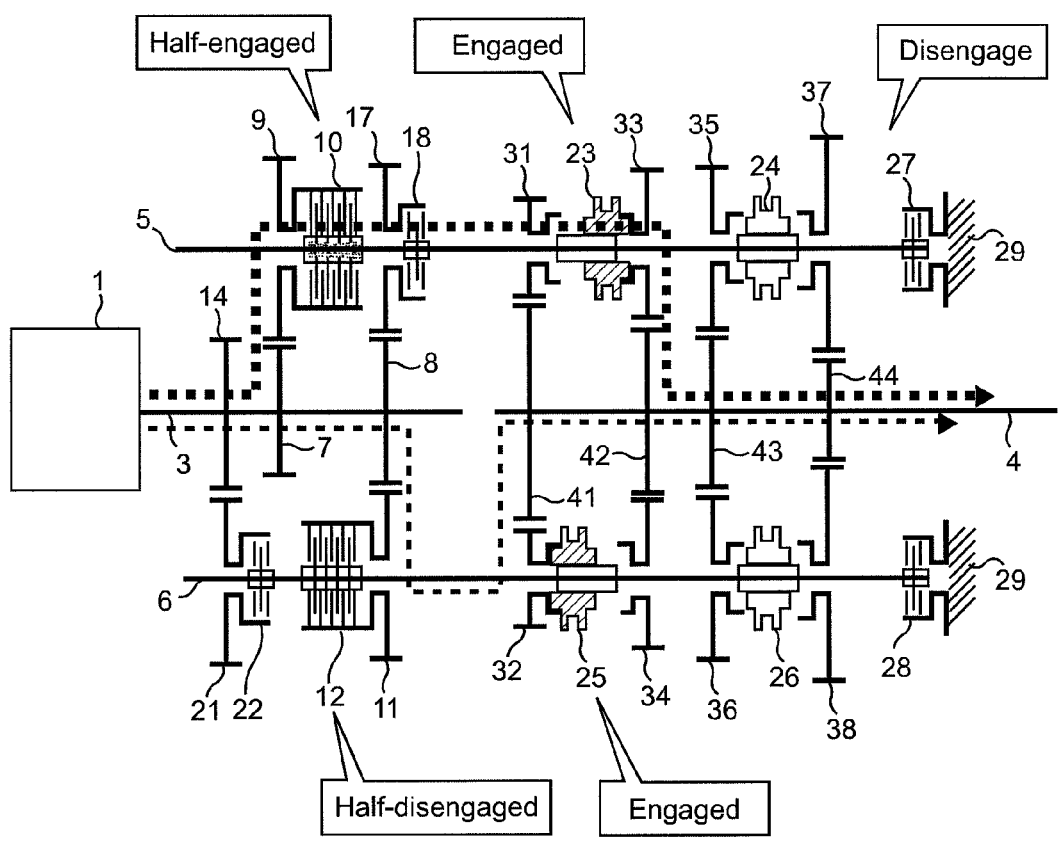
FIG. 14 is an explanatory diagram that illustrates the working of the second embodiment.

Next, the working in the upshifting from the 2nd-gear drive to the 3rd-gear is explained referring to FIG. 13 and FIG. 14. That is, the working in the upshifting between the adjoining transmission output gears namely from the 2nd-gear 32 that meshes with the transmission output gear 41 to the 3rd-gear 33 that meshes with the transmission output gear 42 will be described.

During the 2nd-gear drive, as illustrated in FIG. 3, the main friction clutch of even-numbered gear range 12 is engaged to couple the main transfer gear of even-numbered gear range 11 with the intermediate shaft of even-numbered gear range 6, and the clutch sleeve 25 is in the engaged state with the internal spline of the 2nd-gear 32. Therefore, the torque from the engine 1 is transferred all to the output shaft 4 along the path indicated by the arrow-headed thick dotted line. To operate the upshift to the 3rd-gear, the clutch sleeve 23 is made to engage with the 3rd-gear 33 as a preliminary to the speed-change during the 2nd-gear drive.

To establish the engaging of the clutch sleeve 23 with the 3rd-gear 33 however, it is necessary to synchronize the speeds of revolutions of the 3rd-gear 33 and the clutch sleeve 23. During the 2nd-gear drive, the 3rd-gear 33 is linked to the 2nd-gear 32 namely the intermediate shaft of even-numbered gear range 6 via the transmission output gear 42, the output shaft 4, and the transmission output gear 41. Therefore, as has been described in the explanation of the embodiment 1, the speed of revolutions of the 3rd-gear 33 is slower than the speed of revolutions of the intermediate shaft of odd-numbered gear range 5.

Although on the other hand, the clutch sleeve 23 rotates integrally with the intermediate shaft of odd-numbered gear range 5, the speed of revolutions thereof is determined by the balance of torques frictionally transferred from the main friction clutch of odd-numbered gear range 10 and from the friction brake 27, and varies depending on the viscosity of the oil.

Under this condition, the main friction clutch of odd-numbered gear range 10 is engaged in a half-clutching state and the friction brake 27 is activated. And then, the operating pressure of the working fluid of the friction brake 27 is controlled so that the speed of revolutions of the intermediate shaft of odd-numbered gear range 5 will become almost equal to the speed of revolutions of the 3rd-gear 33. Engaging the main friction clutch of odd-numbered gear range 10 in a half-clutching state causes the transferring of the torque from the input shaft 3 to the intermediate shaft of odd-numbered gear range 5 along the path indicated by the arrow-headed thin dotted line. When thereby the speed of revolutions of the intermediate shaft of odd-numbered gear range 5 becomes almost equal to the speed of revolutions of the 3rd-gear 33, the speeds of revolutions of the 3rd-gear 33 and the clutch sleeve 23 enter the synchronized state. Then, the spline clutch 23 is engaged with the 3rd-gear 33.

As described above, the main friction clutch of odd-numbered gear range 10 is engaged in the half-clutching state during the 2nd-gear drive, the operating pressure of the working fluid of the friction brake 27 is controlled so that the speeds of revolutions of the 3rd-gear 33 of the gear-shifting destination and the intermediate shaft of odd-numbered gear range 5 will become the synchronized state, and then, the spline clutch 25 is preliminary engaged with the 2nd-gear 32.

After the preliminary engaging of the spline clutch 23 with the 3rd-gear 33, the main friction clutch of odd-numbered gear range 10 is engaged and the main friction clutch of even-numbered gear range 12 is disengaged as illustrated in FIG. 14. Thereby, the torque transferred from the engine 1 to the intermediate shaft of even-numbered gear range 6 switches to the intermediate shaft of odd-numbered gear range 5. As a consequence of this, the torque from the engine 1 is transferred all to the output shaft 4 through the 3rd-gear 33 and via the transmission output gear 42 along the path indicated by the arrow-headed thick dotted line.

Disengaging the main friction clutch of even-numbered gear range 12 causes the torque working on the 2nd-gear 32 to be disappeared. Accordingly, the spline clutch 25 is withdrawn from the 2nd-gear 32 to be disengaged. Thus, the upshift operation to the 3rd-gear completes.

Thus, the upshifting from the 1st-gear 31 to the 2nd-gear 32, wherein these gears mesh with the transmission output gear 41 in common, and the upshifting from the 2nd-gear 32 that meshes with the transmission output gear 41 to the 3rd-gear 33 that meshes with the transmission output gear 42, wherein the transmission gears 41 and 42 are adjacent to each other, are performed as explained above. Other upshiftings: 3rd-gear to 4th-gear, 4th to 5th, 5th to 6th, 6th to 7th, and 7th to 8th are performed likewise.

The downshifting in the embodiment 2 is performed in a similar manner to the one as in the embodiment 1 but with the engaging of the friction clutch 18 or the friction clutch 22 instead; therefore, further explanation is omitted.

The working in the embodiment 2 is performed in a manner similar to that in the embodiment 1. In the speed-changing between the speed-change gear of odd-numbered gear range and the speed-change gear of even-numbered gear range, the intermediate shaft on which the speed-change gear of the gear-shifting destination is installed is linked with the input shaft through the friction clutch. Following this, the speeds of revolutions of the speed-change gear of the gear-shifting destination and the intermediate shaft on which such speed-change gear is installed are brought into the synchronized state. And then, the mechanical clutch is engaged preliminarily. Therefore, this arrangement permits the quick shifting of the mechanical clutch without shock with a simple structure even in the case of a transmission for a large-sized vehicle, which must transfer a large torque, without relying on engine revolution control for clutch synchronization. As for the upshifting, a mechanism for this operation can be furnished only by attaching two friction brakes on the axis ends. Therefore, further reduction of the entire length of the transmission becomes feasible offering advantages of downsizing and lowered cost.

It is however a matter of course that, although the embodiment 1 and the embodiment 2 stated above use a spline clutch as the mechanical clutch, a use of a claw clutch instead of the spline clutch can offer the same advantages.

Further, it is mentioned that above-stated embodiments are to work with such a condition that the speeds of revolutions of the speed-change gear of the gear-shifting destination and the intermediate shaft on which such speed-change gear is installed are brought into the synchronized state. A mechanical clutch is however capable of establishing its engagement even when there is a small difference in the speeds of revolutions or in the degrees of phases with the mating object. Therefore, it is obvious that an attempt to engage a clutch under a near-synchronized state close to an exact synchronization is also within the scope of the present invention.

In the explanation of the embodiments, the illustration of a reversing mechanism that reverses the direction of revolution of the output shaft is omitted. However, the invention still has an advantage in that a reversing mechanism can be accommodated without expanding the overall length or the overall width of a transmission in a layout described below by an effective use of the axially-spread room left on the end of the input shaft. A feasible layout for that purpose includes that a reverse-drive gear and a friction clutch for backward travel, which couples the reverse-drive gear integrally with the input shaft are provided between the input gear of odd-numbered gear range and the input gear of even-numbered gear range installed on the input shaft, and that the reverse-drive gear is arranged so as to mesh with a reverse-driven gear, which rotates integrally with the intermediate shaft of odd-numbered gear range, via an intermediate gear.

Reference Numerals
1 Engine
2 Transmission
3 Input shaft
4 Output shaft
5 Intermediate shaft of odd-numbered gear range
6 Intermediate shaft of even-numbered gear range
7 Input gear of odd-numbered gear range
8 Input gear of even-numbered gear range
9 Main transfer gear of odd-numbered gear range
10 Main friction clutch of odd-numbered gear range
11 Main transfer gear of even-numbered gear range
12 Main friction clutch of even-numbered gear range
13 Input gear for even-to-odd upshift
14 Input gear for odd-to-even downshift
15 Synchronization gear for even-to-odd upshift
16, 18, 20, 22 Friction clutch
17 Synchronization gear for even-to-odd downshift
19 Synchronization gear for odd-to-even upshift
21 Synchronization gear for odd-to-even downshift
23 to 26 Sleeve (Clutch sleeve, Spline clutch)
27, 28 Friction brake
31 1st-gear
33 3rd-gear
35 5th-gear
37 7th-gear
32 2nd-gear
34 4th-gear
36 6th-gear
38 8th-gear
41 to 44 Transmission output gear

The invention claimed is:
1. A twin clutch transmission for a large-sized vehicle, comprising
an input shaft connected to an engine;
an intermediate shaft of odd-numbered gear range and an intermediate shaft of even-numbered gear range, which are arranged in parallel to said input shaft;
an output shaft arranged in parallel to said intermediate shaft of odd-numbered gear range and said even-numbered gear range;
an input gear of odd-numbered gear range and an input gear of even-numbered gear range, which are rigidly installed on said input shaft to transfer the revolution of said input shaft to the intermediate shaft of either of said interme- diated shaft of odd-numbered gear range or said intermediate shaft of even-numbered gear range;

a main transfer gear of odd-numbered gear range rotatably installed on said intermediate shaft of odd-numbered gear range;

a main friction clutch of odd-numbered gear range that couples said main transfer gear of odd-numbered gear range with said intermediate shaft of odd-numbered gear range;

a main transfer gear of even-numbered gear range rotatably installed on said intermediate shaft of even-numbered gear range;

a main friction clutch of even-numbered gear range that couples said main transfer gear of even-numbered gear range with said intermediate shaft of even-numbered gear range;

a plurality of speed-change gears of odd-numbered gear range rotatably installed on said intermediate shaft of odd-numbered gear range;

a plurality of speed-change gears of even-numbered gear range rotatably installed on said intermediate shaft of even-numbered gear range;

a plurality of output gears rigidly installed on said output shaft with each of which gears one speed-change gear of odd-numbered gear range and one speed-change gear of even-numbered gear range that is one range higher than that of such one speed-change gear of odd-numbered gear range are meshed; and a mechanical clutch installed on each of said intermediate shaft of odd-numbered gear range and said intermediate shaft of even-numbered gear range to selectively make mechanical interlock engagement with one of said speed-change gears, wherein the numbers of gear teeth of said speed-change gear of odd-numbered gear range and said speed-change gear of even-numbered gear range, both of which mesh with the same output gear of said output gears, are made to be identical;

the gear ratio of said input gear of even-numbered gear range and said input gear of odd-numbered gear range are configured so that the ratios of the speed-change ratios between the adjoining gear ranges terms a geometric progression;

a clutch synchronization mechanism is provided, which makes the speed of revolutions of the intermediate shaft of either of said intermediate shaft of odd-numbered gear range or said intermediate shaft of even-numbered gear range, on which any of said speed-change gears of gear-shifting destination is installed, and the speed of revolutions of the intermediate shaft of either of said intermediate shaft of even-numbered gear range or said intermediate shaft of odd numbered gear range to be synchronized each other by linking the intermediate shaft of either of said intermediate shaft of odd-numbered gear range or said intermediate shaft of even-numbered gear range, on which the speed-change gear of either of said speed-change gear of odd-numbered gear range or said speed-change gear of even numbered gear range is installed, to said input shaft via either of said input gear of odd-numbered gear range and said main transfer gear of odd-numbered gear range and said main friction clutch of odd-numbered gear range or said input gear of even-numbered gear range and said main transfer gear of even-numbered gear range and said main friction clutch of even-numbered gear range; and said mechanical clutch, which is associated with said speed-change gear and makes selective mechanical interlock engagement therewith, is preliminarily engaged with any of said speed-change gears of the gear-shifting destination prior to the changing of gear range.

2. The twin clutch transmission for a large-sized vehicle according to claim 1, wherein said clutch synchronization mechanism is comprised of:

an input gear for even-to-odd upshift rigidly installed on said input shaft; and a synchronization gear for even-to-odd upshift, which is rotatably installed on said intermediate shaft of odd-numbered gear range meshing with said input gear for even-to-odd upshift and is to be coupled with said intermediate shaft of odd-numbered gear range through an associated friction clutch, wherein the numbers of gear teeth of said synchronization gear for even-to-odd upshift and said input gear of even-to-odd upshift are made to be such a number that the gear ratio between these gears is inversely proportional to the square of the common ratio (or geometric ratio) that is the ratio of the speed-change ratios between the adjoining gear ranges.

3. The twin clutch transmission for a large-sized vehicle according to claim 2, wherein said clutch synchronization mechanism is comprised of:

an input gear for odd-to-even downshift rigidly installed on said input shaft; and a synchronization gear for odd-to-even downshift, which meshes with said input gear for odd-to-even downshift and is to be coupled with said intermediate shaft of even-numbered gear range through an associated friction clutch, wherein the numbers of gear teeth of said synchronization gear for odd-to-even downshift and said input gear of odd-to-even downshift are made to be such a number that the gear ratio between these gears is proportional to the square of the common ratio (or geometric ratio) that is the ratio of the speed-change ratios between the adjoining gear ranges.

4. The twin clutch transmission for a large-sized vehicle according to claim 1, wherein said clutch synchronization mechanism is comprised of a friction brake installed on each of said intermediate shaft of odd-numbered gear range and said intermediate shaft of even-numbered gear range; and thereby the speed of revolutions of said intermediate shaft of odd-numbered gear range or said intermediate shaft of even-numbered gear range is made to be controllable.

* * * * *